(12) United States Patent
Gregory et al.

(10) Patent No.: US 7,836,087 B1
(45) Date of Patent: Nov. 16, 2010

(54) GRAPHS OF COMPONENTS FOR DIGITAL PRODUCTIONS

(75) Inventors: Eric Gregory, Larkspur, CA (US);
Michael Ferris, Oakland, CA (US);
Robert Jensen, Berkeley, CA (US);
Oren Jacob, Piedmont, CA (US)

(73) Assignee: Pixar, Emeryville, CA (US)

( * ) Notice: Subject to any disclaimer, the term of this patent is extended or adjusted under 35 U.S.C. 154(b) by 831 days.

(21) Appl. No.: 11/759,919

(22) Filed: Jun. 7, 2007

Related U.S. Application Data

(60) Provisional application No. 60/812,294, filed on Jun. 9, 2006.

(51) Int. Cl.
G06F 7/00 (2006.01)
G06F 17/00 (2006.01)

(52) U.S. Cl. ...................................................... 707/793
(58) Field of Classification Search ........................ None
See application file for complete search history.

(56) References Cited

U.S. PATENT DOCUMENTS

2007/0178968 A1* 8/2007 Cote-Charpentier et al. .. 463/42

OTHER PUBLICATIONS

Qi-Cheng et al., "High-Extensible Scene Graph Framework Based on Component Techniques", Journal of Zhejiang University SCIENCE A 2006 7(7), pp. 1247-1252, 2006.*

* cited by examiner

*Primary Examiner*—Neveen Abel Jalil
*Assistant Examiner*—Michael J Hicks
(74) *Attorney, Agent, or Firm*—Law Office of Jonathan Hollander PC

(57) ABSTRACT

The components of a computer graphics scene can be organized using multiple independent graphs. Each component can include graph relationship attributes specifying its location in one or more graphs. Graph can be utilized for any purpose within the digital production pipeline. A component can include any number of graph relationship attributes. The number and type of graph relationship attributes can be different for each component. Software tools can access one or more graphs to determine structural or functional relationships between components. Software tools can enforce policies for a graph independent of other graphs. Software tools can optimize the components of a graph independent of other graphs. A graph relationship attribute of a component can include optional parameter data to specify properties of the relationship between two or more components. Layer data structures including opinions of value can specify graph relationships.

60 Claims, 15 Drawing Sheets

GRAPHS OF COMPONENTS FOR DIGITAL PRODUCTIONS

CROSS-REFERENCE TO RELATED APPLICATIONS

This application claims priority to U.S. Provisional Patent Application No. 60/812,294 filed Jun. 9, 2006, which is incorporated by reference herein for all purposes. This application is related to U.S. patent application Ser. No. 11/738,953, entitled "Layering and Referencing in Scene Description," filed Apr. 23, 2007, which is incorporated by reference herein for all purposes.

BACKGROUND OF THE INVENTION

The present invention relates to the field of computer graphics, and in particular to methods and apparatus for creating, modifying, and using components to create computer graphics productions. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking and artistically compelling rendered images and animations.

Computer graphics images, animations, and other productions involving computer graphics, such as interactive entertainment software, are created from a number of different components. Generally, components include any data and instructions used to create products and applications that include computer graphics. Components can include three-dimensional models of geometry; texture maps, other arrays of data, lighting, and shading programs used to determine the visual appearance of models; and animation data and deformer functions used to specify changes and motion over time. One or more components are typically stored as a digital asset. A digital asset can be a file, database table, executable program or script, or any other type of persistent data store.

Components can be related or associated with each other. Components may be related together in a hierarchy for ease of use or to specify functionality. For example, a model of a character and a model of the character's hat may be associated together for ease of use. In another example, a set of coordinate transformations may be associated together in a specific order to define a sequence for applying transformations to models. The relationships between two or more components can be specified by the attributes of these components or by attributes of separate components.

Components are typically combined during rendering to produce an animated sequence. For example, geometric models, shading programs and data, lighting, animation data, and deformers all need to be combined correctly to produce a rendered image or scene. The associations or relationships between components can specify how the components should be combined to create a rendered image or scene.

Additionally, due to dependencies and other relationships between components, some activities may need to be performed in a specific order. The activities that create and modify digital assets and their components are sometimes collectively referred to as a digital production pipeline.

Typical digital production pipelines and computer graphics applications organize components for a scene using a single hierarchical data structure. The hierarchical data structure organizes components according to their name, path, and/or other unique identifying information. In this type of hierarchical data structure, a component's location in the hierarchy may correspond with its storage location.

Additionally, many typical computer graphics applications utilize the single, or master, hierarchical data structure of a scene to specify functional relationships between components. For example, the arrangement of coordinate transformations in the master hierarchical data structure specifies the sequence for applying transformations to models. In another example, a set of shading programs may be associated together in a specific order to define a sequence of data flow for determining shading for models.

The use of a single hierarchical data structure to describe the relationships between components has numerous disadvantages. First, this type of hierarchical data structure can include thousands or millions of components, such as geometric models, shading programs and data, lighting, animation data, deformers, transformation hierarchies, simulation data, scene layout specifications, and other types of components. Because there are so many components of so many different types, the creation, modification, manipulation, debugging, and processing of the master hierarchical data structure is unwieldy, error-prone, and time-consuming.

Additionally, different activities within the digital production pipeline view and manipulate the components in a scene differently. For example, modelers creating geometric models may wish to view and manipulate components according to physical relationships, such as the physical relationship between the arm model and the torso model of a character model. Shading artists may wish to view components according to shading relationships, such as the arrangement and sequence of shading programs and data used to determine shading for surfaces. Lighting artists may wish to view components according to lighting relationships, such as the models lit by a particular light. However, because the master hierarchical data structure stores all of the components of a scene, all of the workers on the digital production pipeline are forced to view and manipulate components in the same way. This can dramatically reduce the efficiency in creating and manipulating components.

Another disadvantage arises from the specification of functional relationships between components using the master hierarchical data structure. As discussed above, components are often arranged in the master hierarchical data structure according to their names and paths. The functional relationship between components corresponds to the components' locations within the master hierarchical data structure. If a component is moved or renamed, its location in the master hierarchical data structure may change. As a result, the functional relationship between this component and other components may also change. This can lead to errors and inadvertent changes to the scene.

It is therefore desirable for a system and method to efficiently organize components for one or more scenes. It is further desirable for the system and method to enable components to be viewed and manipulated according to any arbitrary relationships to facilitate worker efficiency. It is still further desirable for the system and method to enable functional relationships between components to be established arbitrarily and independent the components' other attributes and relationships. It is also desirable for the system and method to enable the progressive modification, refinement, or creation of multiple versions or variations of the relationships between components without disrupting activities upstream or downstream in the digital production pipeline.

BRIEF SUMMARY OF THE INVENTION

In an embodiment, the components of computer graphics scenes can be organized using multiple independent graphs or hierarchies. Each component can include graph relationship attributes specifying its location in one or more independent graphs. Each graph can be utilized for any purpose within the digital production pipeline. A component can include any arbitrary number of graph relationship attributes. The number and type of graph relationship attributes can be different for each component.

Graph relationship attributes can specify unique, custom-defined graphs for any purpose. Software tools can access one or more graphs to determine functional relationships between components. Software tools can enforce policies for a graph independent of any other graphs. Software tools can optimize the components of a graph independent of any other graph. A graph relationship attribute of a component can include optional parameter data to specify additional properties of the relationship between two or more components. Layer data structures including opinions of value can specify graph relationships.

In an embodiment, a data structure for representing a component comprises a first attribute specifying a first relationship between the component and at least a second component within a first graph; and a second attribute specifying a second relationship between the component and at least a third component within a second graph. The first graph does not depend on the second graph.

In embodiments, the graphs may represent namespace relationships, shading relationships, execution order graph relationships of articulation components, transformation graph relationships of animation components, modeling relationships, lighting relationships, and/or custom-defined relationships between components.

In an embodiment, the first attribute may include a component quality, such as an attribute value or behavior, specifying a property of the first relationship between the component and the second component.

In an embodiment, the graph relationship attributes may be defined in layer data structures. Layer data structures can include opinions of value of attributes, including graph relationship attributes. The opinions of value of graph relationship attributes can define and/or override graph relationship attributes and their attribute values. The layer data structures can add graph relationship attributes to components that do not include these types of attributes in their initial authored state.

BRIEF DESCRIPTION OF THE DRAWINGS

The invention will be described with reference to the drawings, in which.

In the drawings, the use of identical reference numbers indicates similar elements.

DETAILED DESCRIPTION OF THE INVENTION

Figure 1:
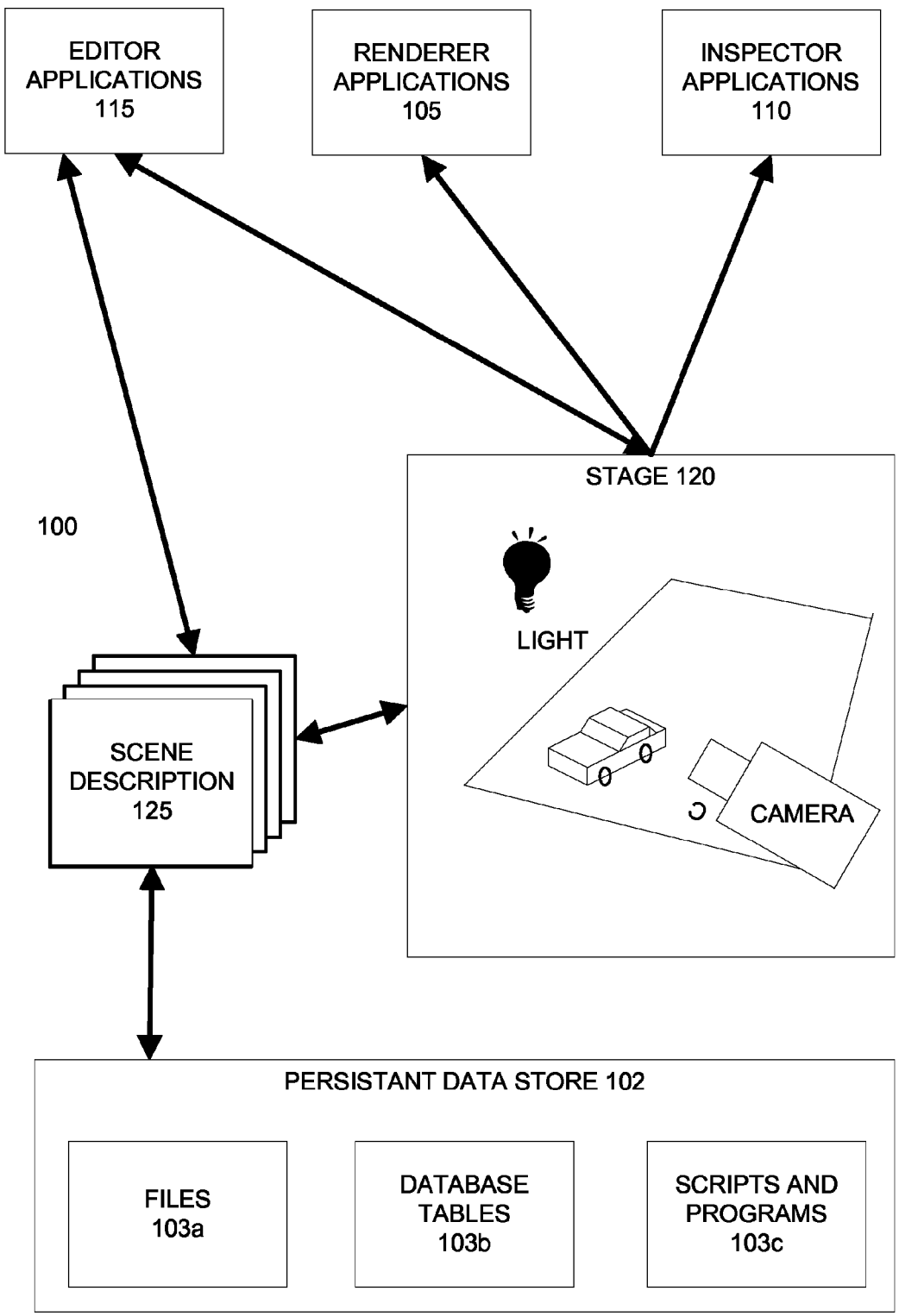
FIG. 1 illustrates a system for creating, modifying, and accessing components in a digital production pipeline according to an embodiment of the invention.

In an embodiment, a computer graphics system includes several core system behaviors for manipulating components. Examples of core system behaviors include set membership, inclusion of effect, inheritance of properties, and ordering. An embodiment of the invention uses graphs between components to specify the application of one or more of these core system behaviors to components. The graph associated with any one of the core system behaviors is not dependent on any of the other graphs or associated core system behaviors.

In an embodiment, components include component qualities that define aspects of the components. A component quality can specify a value of an attribute of a component, a behavior of a component in the computer graphics system, or a relationship between components in the computer graphics system.

In an embodiment, component relationships are defined using attributes of components that specify the relative location of a component with respect to other components in one or more independent graphs or hierarchies. Each component can include one, two, or more independent graph relationships with the same components. Thus, although the same components can appear in multiple independent graphs, the relationships between these components can be different within each graph.

Each graph can be utilized for a different purpose within the digital production pipeline. For example, a first graph can specify the use of the set membership core system behavior to define a namespace hierarchy that identifies components. Additional graphs can be used to express functional relationships between components, such as transformation hierarchies, shading program bindings to models, and lighting relationships. Often, a graph can be used to specify the application of multiple core system behaviors to components. For example, a transformation graph specifying the transformations of components used for animations can utilize set membership core behavior and the inheritance core behavior. In another example, an execution graph specifying the execution order of articulation or deformer functions can utilize the set membership and the ordering core behaviors. In these examples, the set membership defined by the transformation graph is different from the set membership defined by the execution graph.

Additional graphs can organize components to facilitate specific activities within the digital production pipeline. For example, a first graph can organize the components of a scene in a form convenient for animation activities, while a second graph re-organizes the same components in a form convenient for articulation activities. In this example, the first graph may specify a first ordering of components to be used in transformation and the second graph may specify a second ordering of components to be used to execute sequences of deformer programs and other articulation-related components.

Additionally, components can inherit different component qualities, such as component attributes or component behaviors, via different graphs. For example, a first graph may be used to specify animation attributes and a second graph may be used to specify shading attributes. In this example, a component's location within the first graph would specify its animation attributes and its location within the second graph would specify the component's shading attributes.

In an embodiment, the identity of a component persists across multiple hierarchies. The identity of a component can be established using a namespace hierarchy, any other graph or hierarchy, or unique component identifiers, such as GUIDs.

Figure 5:
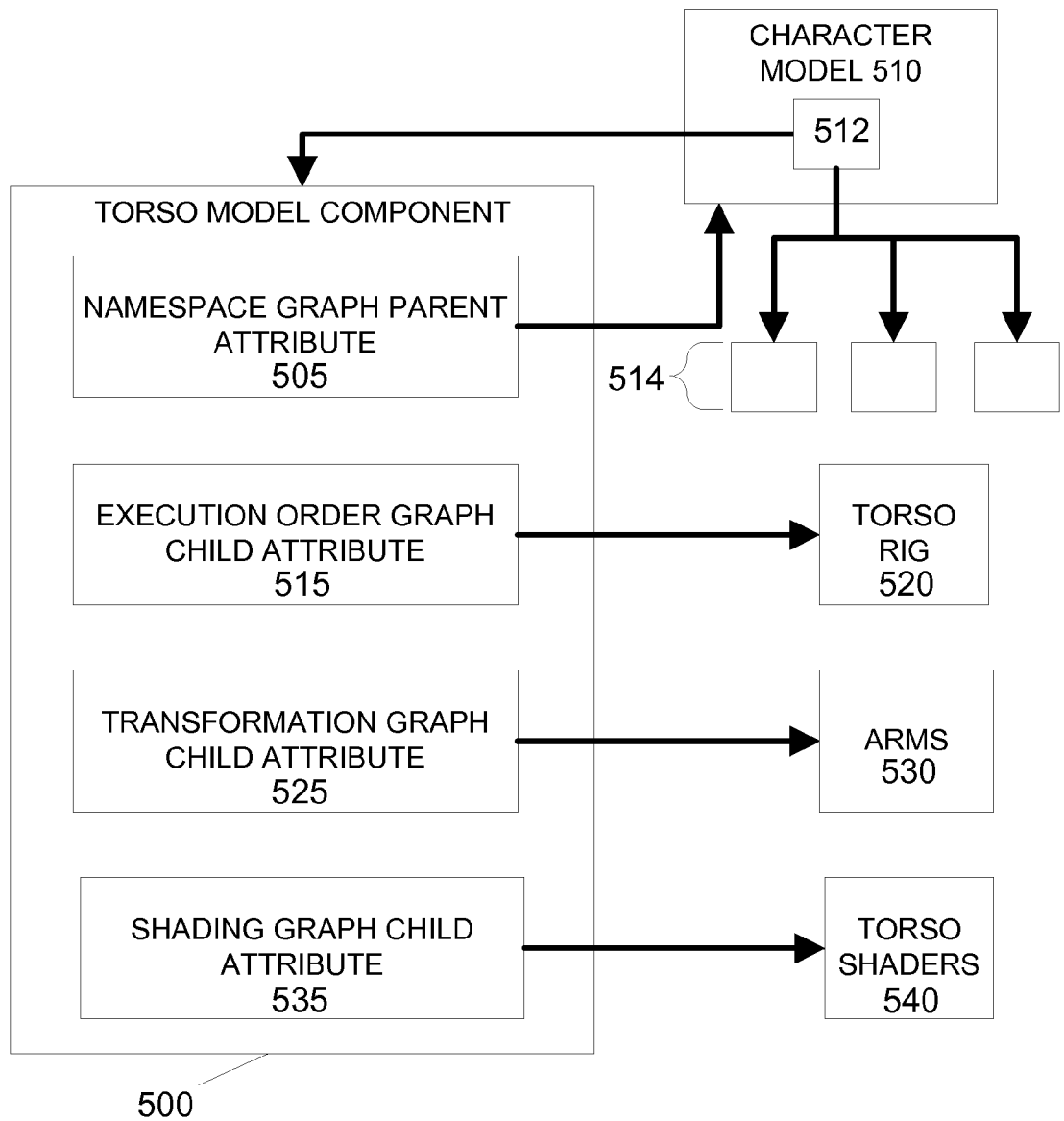
FIG. 5 illustrates a portion of a component data structure enabling the specification of arbitrary graph relationships according to an embodiment of the invention.

FIG. 5 illustrates a portion of a component data structure enabling the specification of arbitrary independent graph relationships according to an embodiment of the invention. A data structure of a component 500 includes attributes specifying properties of the component. To specify graph relationships with the component, an embodiment of the data structure of the component 500 may include one or more graph relationship attributes. Each graph relationship attribute specifies a relationship between the component 500 and one or more other components. Each relationship's attribute specifies the component's relationship within an independent graph of components.

For example, component 500, which is a model of a torso in this example, includes graph relationship attribute 505, specifying the component's location in a namespace hierarchy. In this example, namespace graph relationship attribute 505 specifies that the parent of the torso component 500 is character model 510 in a namespace hierarchy. In an embodiment, character model component 510 includes a corresponding namespace child graph relationship attribute 512, which indicates that component 500 and other components 514 are children of component 510 in the namespace hierarchy. In an embodiment, the namespace hierarchy may be used for the identification of components, for specifying the scope of referencing and containment of a component and its child components, if any.

Additionally, component 500 includes graph relationship attribute 515 specifying the component's 500 location in a graph of component ordering, which can be used to specify the execution order of rigging or articulation-related components. In this example, execution order graph relationship attribute 515 specifies that the child of the torso component 500 is a torso animation rig component 520 in an execution order graph of rigging or articulation components.

Similarly, component 500 includes graph relationship attributes 525 and 535, specifying the component's 500 locations in graphs of animation and shading components, respectively. In this example, the component 500 is the parent of arm model component 530 in a transformation graph specifying animation component behavior and the parent of torso shading components 540.

In an embodiment, a component can include any arbitrary number of graph relationship attributes. In further embodiments, the number and type of graph relationship attributes can be different for each component. For example, a model component, such as example component 500, may include graph relationship attributes specifying its locations in graphs for models, shading, articulation, animation, lighting, and simulation, while a light component may include graph relationship attributes specifying its locations only in graphs for lighting and animation. In an embodiment, a component may only be required to belong to one graph used to identify the component, such as a namespace hierarchy graph. A component's membership in any other graph is optional.

In a further embodiment, a component can include graph relationship attributes to specify unique custom-defined graphs for any purpose. Custom-defined graphs of components can be defined for specific scenes, for specific departments, or for specific activities within the digital production pipeline. For example, some components in a car racing scene could be included in a custom-defined collision graph, used by software tools in the digital production pipeline to determine and track collisions between objects. In other examples, relationships hierarchies can be used to organize and specify attributes for other types of simulations, visual effects, behavior-driven animation, or other animation or rendering technology. As custom-defined graphs of components are independent of any other graphs or hierarchies defined for components, custom-defined graphs facilitate the integration of new technology into the digital production pipeline without disrupting any pre-existing relationships between other components.

In an embodiment, the namespace hierarchy and/or any other hierarchies can be specified entirely in terms of parent attribute relationships, in which each component includes a graph relationship attribute specifying its parent component in a given hierarchy. In a further embodiment, the namespace hierarchy and/or any other hierarchies can be specified entirely in terms of child attribute relationships, in which each component includes a graph relationship attribute specifying its child component in a given hierarchy. In still a further embodiment, the namespace hierarchy and/or any other hierarchies can be specified in terms of parent and child attribute relationships, in which each component includes graph relationship attributes specifying its parent and/or child components in a given hierarchy.

Functional relationships between components are implemented by software tools in the digital production pipeline. In an embodiment, different types of functional relationships between components are specified by independent graphs. For example, a custom-defined graph by default may not have any functions associated with its relationships between components. However, a software tool, script, or other type of application can be specified to perform a custom-defined function between components connected in the custom-defined graph. In this embodiment, the software tool accesses the appropriate graph to identify two or more components associated by a relationship in the custom-defined graph and applies the customer-defined function to these components. For example, a software tool can access the shading graph to determine the shading relationships between components or the transformation graph to determine the animation relationships between components. Because each of these graphs is specified independently by separate attributes of each component, changes in the functional relationships between components in one graph cannot inadvertently affect or break the relationships of these components in any other graph.

Moreover, each software tool is permitted to enforce any arbitrary policies or rules on components within one graph without restricting or limiting the policies or rules applied by other software tool on components within other graphs. For example, some software tools may wish to restrict the number, type, or graph structure of relationships between components in one or more graphs to prevent errors or optimize processing of components. Graph structures can include a general unstructured graph, a directed or undirected graph, an acyclic graph, a tree graph, or any other type of graph known in the art.

For example, circular references or graph cycles may be prohibited in a transformation hierarchy of components, as this behavior is mathematically undefined. However, circular references between components in a lighting graph is acceptable, such as when a first object provides light to a second object and the second object provides light back on the first object. Because the transformation hierarchy graph and the lighting graph are specified independently, software tools can enforce a policy preventing the creation of circular references on the transformation hierarchy graph, thereby preventing errors, without affecting relationships between components in the lighting graph.

In a further embodiment, each graph relationship attribute of a component can include optional parameter data. The parameter data can be expressed as a component quality, such as an attribute value, component behavior, or a relationship between components. In this embodiment, the optional parameter data specifies additional properties of the relationship between two or more components. For example, a graph relationship attribute of a light component can specify that the light component provides light to a first model component. This example graph relationship attribute can further include an intensity value indicating the absolute or relative intensity of the light received by the model component from a light component. This intensity value can be specified on a per relationship basis. This enables the intensity of light between the light component and the first model component to be varied independently of the intensity of light provided by this light component to any other model components. Other examples of graph relationship attribute parameters include gravity, wind, or other simulation forces, and other lighting and shading parameters. Each graph relationship attribute can include any number parameters of any arbitrary data types.

Figure 6A:
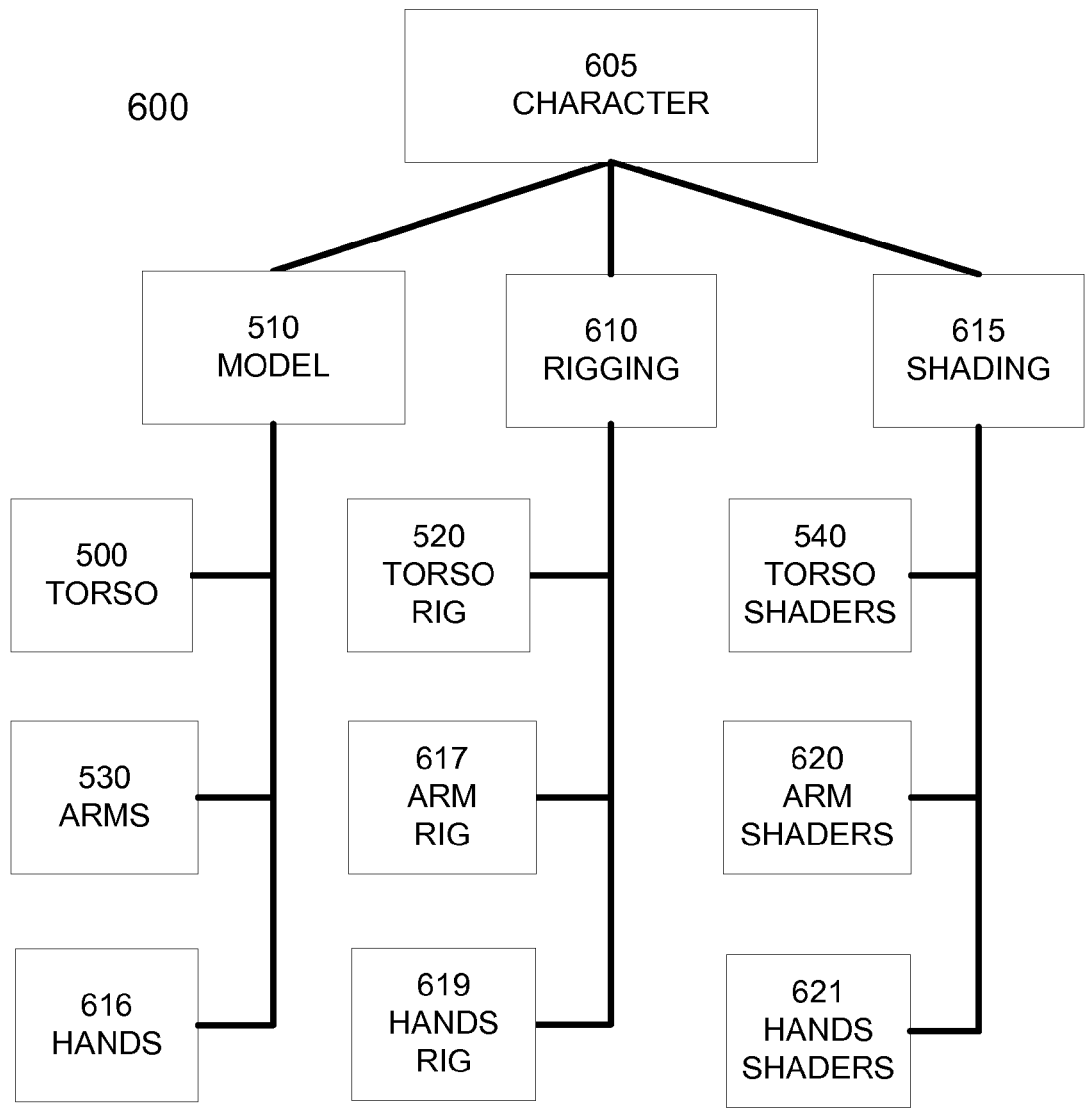
FIGS. 6A-6D illustrate global graphs based on example graph relationship attributes of components according to an embodiment of the invention.

FIGS. 6A-6D illustrate global graphs based on example graph relationship attributes of components according to an embodiment of the invention. FIG. 6A illustrates a namespace graph 600 for an example character 605. Character 605 includes namespace elements for the model 510, rigging 610, and shading 615 components. Model namespace element 510 corresponds with the component 510 discussed with reference to FIG. 5.

In the namespace graph 600, the torso component 500, similar to that discussed above, is the child of model namespace element 510 component. Additional child components of model namespace element 510 in graph 600 include arm models 530, discussed above, and hands model 616.

The rigging namespace element 610 of namespace graph 600 includes child components torso rig 520, discussed above, arm rig 617, and hands rig 619. The shading namespace element 615 of namespace graph 600 includes child components torso shaders 540, discussed above, arm shaders 620, and hands shaders 621.

Figure 6B:
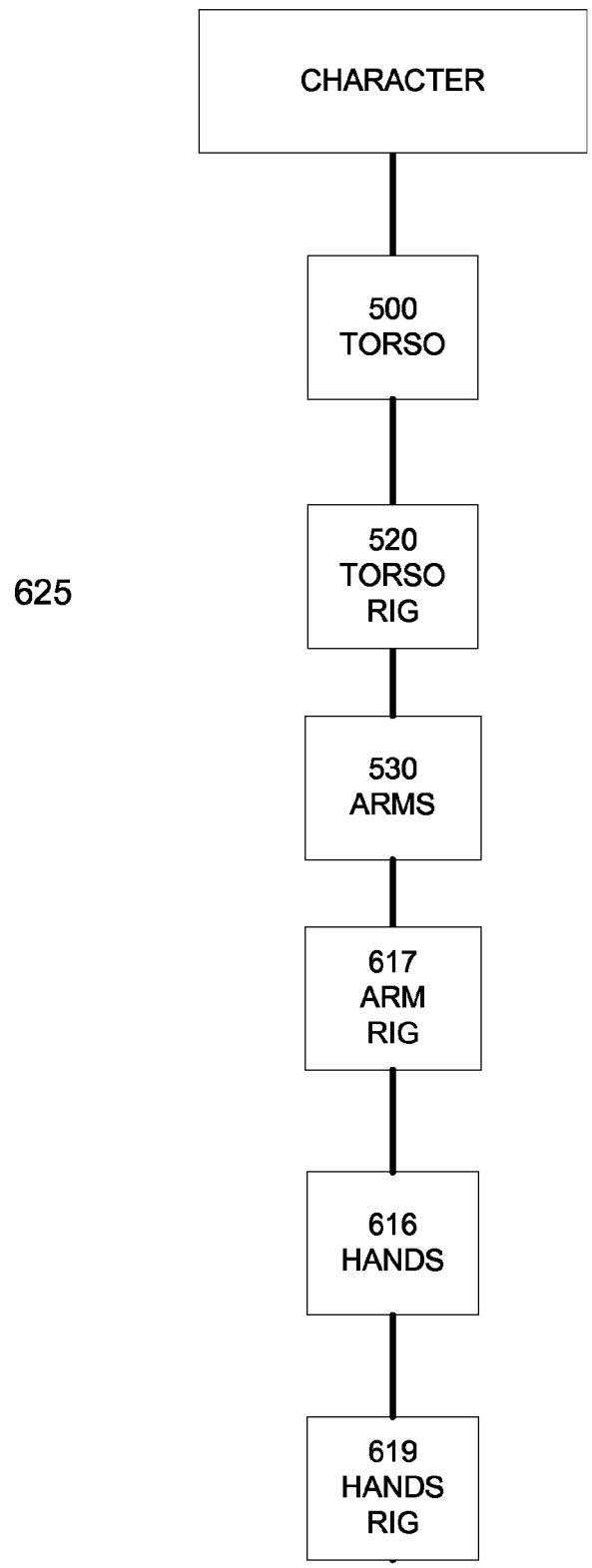

FIG. 6B illustrates a component ordering graph 625 adapted to specify the execution order of articulation or rigging components for example character 605. Example character 605 in the component ordering graph 625 includes a child component of torso model 500. As specified in the data structure of FIG. 5, the torso model component has a rigging child of torso rig 520.

Similarly, the other components of character model 605 can specify additional relationships in the component ordering graph 625. For example, the arms model 530 is the child of the torso rig 520 in component ordering graph 625. The arm rig 617 is the child of the arms model 530, the hands model 616 is the child of the arm rig 616, and the hands rig 619 is the child of hands model 616 in the component ordering graph 625.

Figure 6C:
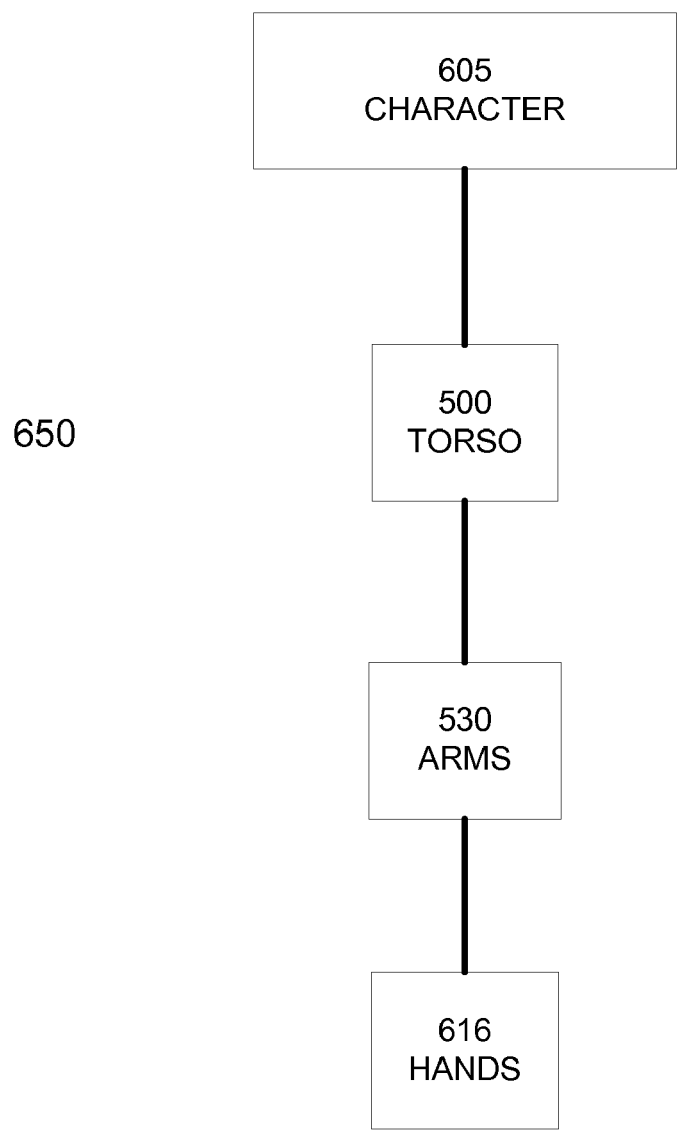

FIG. 6C illustrates a transformation graph 650 adapted to specify animation relationships for example character 605. Example character 605 in the transformation graph 650 includes a child component of torso model 500. As specified in the data structure of FIG. 5, the torso model component 500 has an animation child of arms model 530. Similarly, the other components of character model 605 can specify additional relationships in the transformation graph 650. For example, the hands model 616 is the child of the arms model 530 in the transformation graph 650.

Figure 6D:
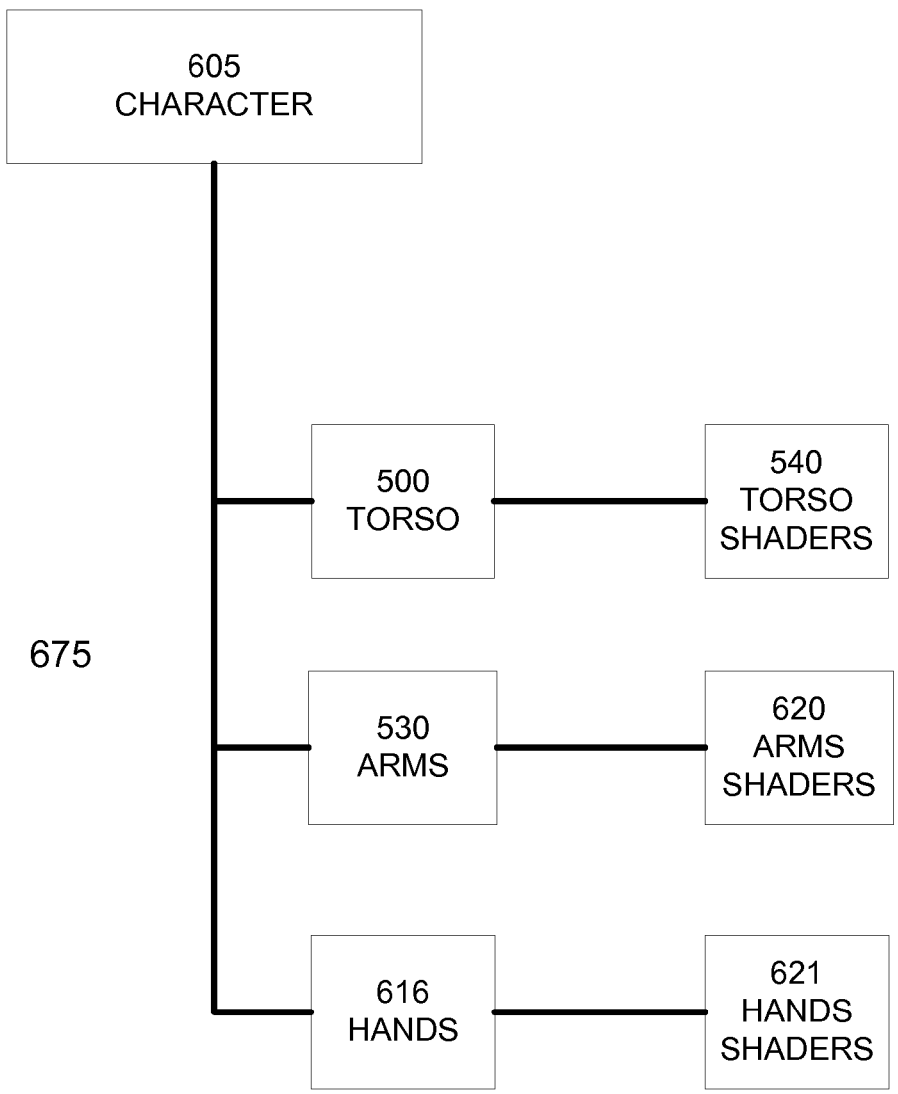

FIG. 6D illustrates a shading graph 650 for example character 605. Example character 605 in the shading graph 675 includes children components of torso model 500, arms model 530, and hands model 616. In this example, the torso model 500 has a child component of torso shader 540 in shading graph 650. Similarly, the other components of character model 605 can specify additional relationships in the shading graph 675. For example, the arms model 530 has a child of the arms shaders 620, and the hands model 616 has a child of the hands shaders 621.

It should be noted in this example that some of the components in namespace graph 600 are not included in component ordering graph 625, transformation graph 650, or shading graph 675, because the omitted components are not relevant to these graphs and thus do not have the corresponding graph relationship attributes specified.

FIG. 1 illustrates a system 100 for creating, modifying, and accessing components in a digital production pipeline according to an embodiment of the invention. A digital production pipeline can include a number of different activities that create, modify, combine, and process digital assets and their components to produce a final product, such as an animated sequence or an interactive software application. For large digital productions, such as in an animation or interactive digital production studio, it is often necessary for multiple people to be working on different activities of the digital production pipeline at the same time. Often, different people will be working on the same or related components at the same time. Although dependencies between components may dictate the order of activities in general, typically some activities may be performed out of order with dependencies between associated components, if any, resolved at a later time.

Often, the digital production pipeline begins with modeling activities. Modeling activities create model components representing the three-dimensional geometry of characters, sets, props, and other objects. Three-dimensional geometry can be defined using three-dimensional modeling software, two- or three-dimensional scans of physical objects, procedural modeling languages, and/or other techniques. The three-dimensional geometry of model components can be represented using any type of mathematical representation, including particles, polygons, higher order surface functions, solid geometry, volumetric data, and subdivision surfaces.

Articulation activities follow the creation of a model component. For model components that will be animated, articulation activities specify how an associated object can be animated. The articulation components associated with a model component can specify the position and operation of joints. Articulation components can also be used to abstract complex motions to relatively simple control parameters, referred to as animation variables. Articulation components may include deformer functions adapted to manipulate a model component based on animation variable values. Deformer functions can perform complex manipulations of a model component in response to animation variables. For example, a single animation variable can define the degree of opening of a character model's mouth. In this example, the value of the animation variable is an input to one or more deformer functions that manipulate several different parts of a character model armature, or skeleton, and/or modify portions of the surface of the character model to create a modified character model having a mouth opened to the desired degree.

Shading activities define optical attributes of model components. Shading activities may include the specification of the color, transparency, reflectivity, and other optical attributes of the surface and/or interior of associated model components. Shading components can include texture map data of any number of dimensions, defined explicitly and/or procedurally; three-dimensional or projected painting attributes; noise data; shadow maps; normal or bump maps; and/or shader programs or procedures.

Animation activities specify the motion or animation of model components. Animation components may specify animation as changes in animation variable values and other attributes of model components over time. The articulation components are used to translate changes in animation variable and other attribute values into changes in the position, orientation, appearance, and other characteristics of the associated model components. Animation activities can specify animation variable values directly, or indirectly using algorithms such as forward or inverse kinematics, keyframes and in-betweening, and motion capture.

Similarly, simulation activities can be used to determine the appearance, animation, and/or behavior of components. Simulation techniques can be used to mimic complex real-world phenomena, such as the appearance and motion of fluids, hair, fur, and cloth. Simulation techniques can also be used for pseudo-realistic or fanciful phenomena. The components output by simulation activities are often similar to components created using animation and shading activities, and therefore can be incorporated and applied in the digital production pipeline in a similar manner.

Layout activities arrange components such as models, articulation, shading, and animation together in one or more scenes or shots. Layout activities can also include the specification of one or more cameras, each representing a desired rendering viewpoint, for each scene. The layout of each scene may be specified by a component incorporating or referencing other components or by a portion of the attribute values of the components of the scene.

Lighting activities specify the location and attributes of one or more light sources in a scene. Light sources are components that specify the amount, direction, and type of light falling on one or more model components in a scene. The location and attributes of light source components can change over time through an association with an animation component.

Rendering activities convert layout components and associated model, articulation, shading, animation, simulation, lighting, and other components into one or more images representing a scene from a desired rendering viewpoint. Rendering activities can use any rendering techniques or combination of techniques known in the art, including rasterization, scanline rendering techniques, image based rendering techniques, global illumination, radiosity, and ray tracing. Rendering can be done at interactive frame rates or offline.

For non-interactive products, the output of the renderer can be composited, edited, mixed with audio, and otherwise processed to create the finished movie. Animated sequences from two or more cameras positioned within a scene or from multiple scenes together can be combined to form a finished sequence. Editing information can be represented in the form of components such as edit decision lists that indicate the location, length, and sequence of animation sequences to be combined. For interactive productions, the finished product can include digital assets containing all the required components, a renderer, and control logic responsive to user input. User input is processed by the control logic to manipulate the state of components. The renderer then processes the components to provide an interactive presentation to the user.

System 100 includes a number of applications for creating, viewing, modifying, and processing digital assets and their components. Examples of these applications include renderer applications 105, inspector applications 110, and editor applications 115. Renderer applications 105 are adapted to process components to create one or more images. Renderer applications 105 can utilize any rendering techniques or combinations of techniques known in the art, including ray casting and ray tracing, scanline rendering, rasterization, and image based rendering. Renderer applications 105 can produce images at interactive frame rates or at substantially slower rates depending upon the rendering technique, the available computing resources, and the desired degree of visual detail. Renderer applications 105 can also edit and combine sequences of animation.

Inspector applications 110 are adapted to present users with the state of one or more components. The state of components can include the values of one or more attributes. Attributes can define all aspects of a component, including whether the component itself is active, or is present, in a scene. Additionally, the state of components can change over time within an animated sequence and at different points in the digital production pipeline. Inspector applications 110 can present state information of components in a number of different formats, including in the form of text, tables, timelines, charts, graphs, images, and renderings from one or more viewpoints.

Editor applications 115 are adapted to create and modify the state of one or more components. Editor applications 115 can utilize interfaces adapted to manipulate data in the form of text, tables, timelines, charts, graphs, images, and renderings from one or more viewpoints to create components and modify their attributes. Additionally, a user can input attribute values directly using any type or combination of input devices well known in the art, including keyboards, mice, and digitizer tablets. Additionally, editor applications 110 can analyze user input to indirectly set or modify one or more attribute values. For example, a user input could be processed by a filtering algorithm in an editor application to modify several attributes simultaneously in varying amounts.

Example applications 105, 110, and 115 can be combined into hybrid applications that perform inspector, editor, and/or renderer functions together. In an embodiment, system 100 includes an application programming interface enabling any additional applications to access and modify components.

Digital production pipeline applications, such as example applications 105, 110, and 115, can store and retrieve components in digital assets, such a files, 103*a*; database tables, 103*b*; and scripts and programs, 103*c*. The digital production pipeline applications can create new digital assets to hold one or more components, modify existing digital assets to add, remove, or modify components, remove unneeded digital assets, and encapsulate one or more digital assets in another digital asset. Digital assets 103*a*, 103*b*, and 103*c* are stored by persistent data store 102, which can be comprised of data storage devices of any type.

In an embodiment, system 100 includes a stage 120. The stage 120 includes an instantiation of the complete state of one or more components for at least one scene. This can include a component such as a model, a light, or a camera; articulation and animation data; a supporting component such as a texture map or a shader; or any combination of components. As discussed below, the stage 120 instantiates the complete state of one or more components for one or more scenes at any point in the digital production pipeline. Components may take on different states, or augment their initial state with additional attributes, at different points of the digital production pipeline. Applications 105, 110, and 115 can create, access, and modify the state of components for one or more scenes via stage 120.

To maintain state information for components for one or more scenes at any arbitrary point of the digital production pipeline, an embodiment of the system 100 represents components as a unified scene description 125. For each component, the unified scene description 125 includes at least one opinion of the value of each of its attributes for one or more scenes, with the exception of any application-supplied or default values. To determine the state of a component for one or more scenes at a given point of the digital production pipeline, the system 100 processes the unified scene description 125 to identify the most appropriate opinions of attribute values for the given point. The system 100 reconstructs or instantiates the component in the stage 120 using the complete set of opinions of attribute values associated with the given point (as well as any application-supplied or default values, if necessary).

In an embodiment, a component can include attributes specifying its relative location in one or more independent graphs or hierarchies. Each graph or hierarchy can be utilized for a different purpose within the digital production pipeline. For example, a first graph, such as a hierarchical graph of a namespace, can be used to specify the identity of components. This first example graph specifies the application of a set membership core system behavior. Additional graphs can be used to express functional relationships between components, such as transformation hierarchies, shading program bindings to models, articulation sequences, and lighting relationships. For example, a second graph specifying the application of a component ordering core system behavior may be used to define the order of execution of articulation components. Additional graphs can organize components to facilitate specific activities within the digital production pipeline. For example, a first graph can organize the components of a scene in a form convenient for animation activities, while a second graph re-organizes the same components in a form convenient for articulation activities.

In an embodiment, system 100 provides an application programming interface enabling software tools in the digital production pipeline to create and modify graph relationship attributes and to search for graphs and their components.

In an embodiment, the graph relationship attribute values of components are specified using the same software applications and techniques used to specify the values of other component attributes, such as editor applications 115. For example, graph relationship attributes, their respective values, and any optional parameter values for components, can be manually entered in a text editor or similar application. Another editor application can arrange components along the axes of a two-dimensional table. Users can then select intersections in the table to indicate the existence of a relationship and properties between the components of the corresponding row and column. Another example of editor applications 115 may enable the specification of relationships between components graphically, for example, by drawing links between icons representing components to specify values for relationship components. Other example editor applications can include hierarchy browsers, multicolumn view browsers, tree-view or other graph-based editors, component inspector applications that enable viewing and modification In further embodiments, components can include default graph relationship attribute types and attribute values. For example, all components may include at least one namespace graph relationship attribute initialized to a default value based on the name or other identifying information of the component. Other components can include default uninitialized relationship types based on the type of component. For example, a model component can be initialized with default graph relationship attributes for model, lighting, shading, and transformation graphs. Graph relationship attributes for articulation, simulation, or any other graphs can be added as needed.

In an embodiment, the graph relationship attributes of components specify local relationships between two or more components. In an embodiment, system 100 includes functions for parsing the graph relationship attributes of components to build a representation of the global graph specified indirectly by graph relationship attributes of sets of components. In further embodiments, system 100 can preprocess, parse, and cache representations of global graphs of components to improve performance. In yet a further embodiment, system 100 can apply optimizations tailored to different types of graphs of components to further improve performance.

Figure 2:
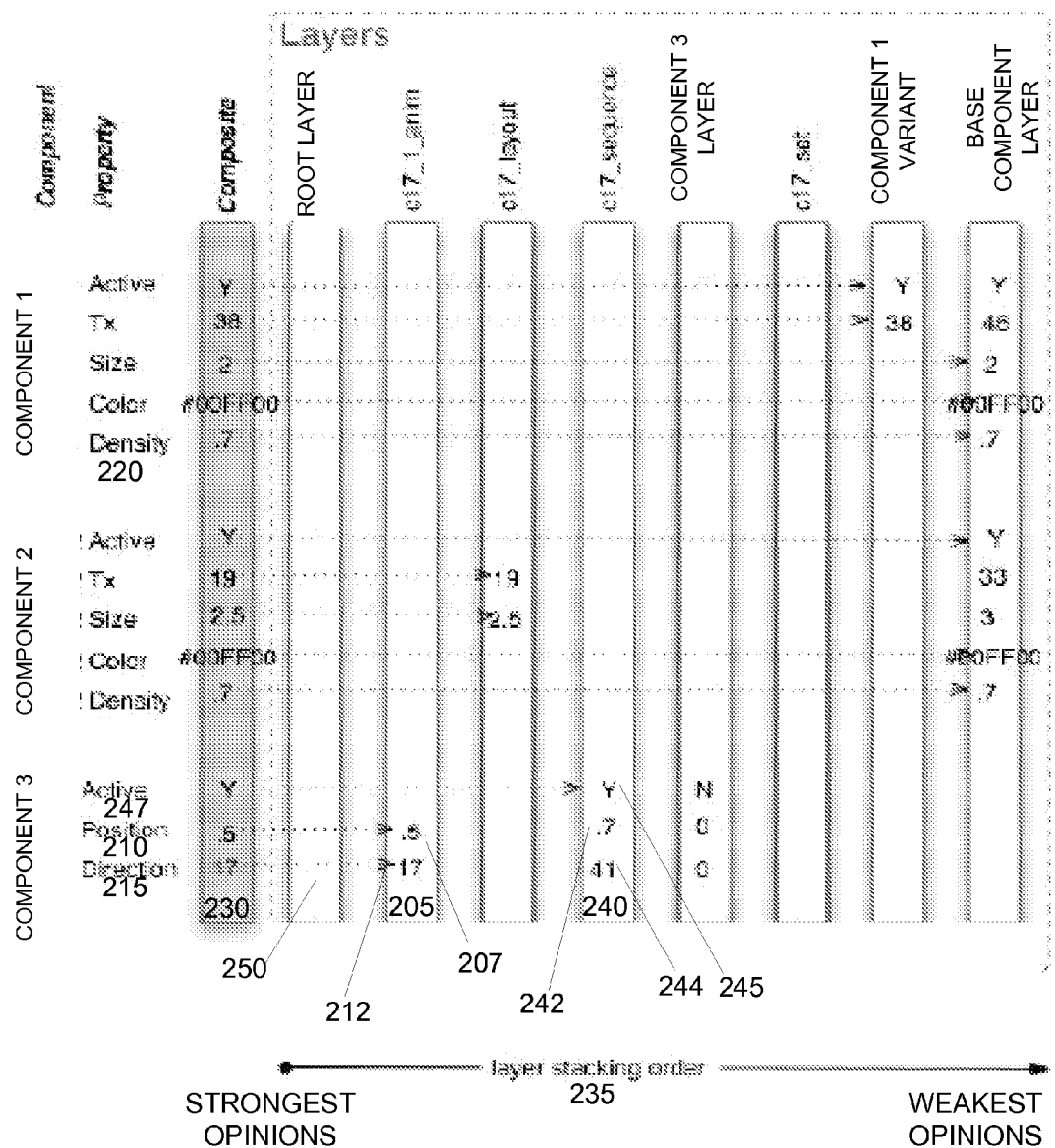
FIG. 2 illustrates a layers data structure specifying attributes of components according to an embodiment of the invention.

FIG. 2 illustrates a layers data structure 200 specifying attributes of components in one or more scenes according to an embodiment of the invention. In an embodiment, a component in one or more scenes is represented using one or more layers of a layer data structure. The layer data structure stores opinions of attribute values for a component. In this embodiment, each non-empty layer is adapted to include an opinion of the value of at least one attribute of at least one component. As discussed in detail below, each layer can override opinions of attribute values from weaker or lower-level layers.

Each layer may be sparsely populated—that is, a layer does not have to include opinions for the value of every attribute of a component. Each layer can specify an opinion of value for a new attribute without having that attribute explicitly declared by a prior layer. A layer can include opinions of value for attributes of multiple components. Additionally, empty layers can be created in early stages of the digital production pipeline as placeholders for opinions of attribute values to be provided at later stages of the digital production pipeline.

In example layer data structure 200, layer 205 includes an opinion 207 that the position attribute 210 of component 3 should be set to a value of 0.5 and an opinion 212 that the direction attribute 215 of component 3 should be set to a value of 17. As can be seen in this example, the opinions of value of other attributes, such as the density attribute 220 of component 1 is undefined in layer 205.

In the above example, attribute values are numerical parameters. However, embodiments of layer data structure 200 allow the specification of any data type for an attribute value, including integers; floating point numbers; characters; strings; Boolean values; geometry data; compound data types such as vectors with two or more dimensions, matrices, structures, arrays, dictionaries, hash tables, elements of edit decision lists; references to one or more components; references to one or more layers; references to elements, tables, or other structures of a database; and references to internal or external functions, scripts, or executable programs.

Layers provide opinions of value for attributes of components in terms of the semantic structure associated with the components. Any arbitrary abstract attribute of a component can be expressed in a layer. Furthermore, one or more layers can provide opinions of value for the attribute of a component in the unique terms or semantic structure defined for that attribute. There is no need to reduce opinions of value of abstract attributes to a common or low-level form, such as pixels or points, to composite the values.

For example, a first layer can specify a model of a character wearing a hat. One attribute of the hat could be its type, such as "sombrero." Another attribute of the hat could be its color, such as "red." A third attribute of a hat could be its material, such as "straw." Thus, from the view of the first layer, the character model should have a red straw sombrero. A second layer that is higher or stronger than the first layer could change the type attribute of the hat from "sombrero" to "top hat." Thus, from the view of the second layer, the character model should have red straw top hat. A third layer that is higher or stronger than the second layer could specify that the color attribute of the hat should be "purple" and the material attribute should be "felt." Thus, from the view of the third layer, the character should have a purple felt top hat. In this example, each layer expresses an opinion of one or more attribute values in terms of the semantics associated with each attribute.

Furthermore, a component may include a cross-reference to another component defined by one or more layers. For example, a Hat component of a character model can be a cross-reference to a specific model of a hat. Thus, when cross-reference is set to a "sombrero" component, the character model includes a model of a sombrero. When the cross-reference is overridden by a layer to a "top hat" component, the character model is changed to include a model of a top hat. Each of these models can be defined by one or more layers, the attributes of which can be wholly or partially or overridden by other layers as described above.

In an embodiment, every activity in the digital production pipeline is associated with one or more layers. Users can create and manipulate layers manually to provide additional control and ease of use for a component. For example, the attributes of different models can be specified in separate layers. In another example, related attribute values for different models in a scene can be specified in the same layer to facilitate easy manipulation. In an embodiment, applications associated with activities can automatically create, access, and modify layers based on context, such as the activity, the type of component, and the action being performed by the user.

The complete authored state of one or more components in one or more scenes at a given point of the digital production pipeline is determined by compositing all of the layers associated with a given point to produce a composite layer 230. The composite layer 230 includes opinions of attribute values for the attributes specified by one or more of the associated layers. The composite layer 230 can also be referred to as a composite scene description.

In an embodiment, a layer stacking order 235 determines the order in which layers are composited. This in turn specifies how attribute values in one layer override corresponding attribute values in other layers. In an embodiment, layers are assigned a strength in absolute or relative terms. For example, a first layer can include a relative strength value indicating that it is stronger than or weaker than one or more other layers. In this embodiment, opinions of attribute values in stronger layers will be at the "top" of the stacking order and will override opinions of attribute values in weaker layers, i.e. layers that are "lower" in the stacking order. The example layer stacking order 235 is a linear order; however, more complicated layer stacking orders with multiple branches can be utilized. In an embodiment, layer stacking orders can be set or modified by digital production pipeline applications, either manually by a user or automatically by applications. In a further embodiment, the strength of layers is defined at least in part with respect to a root layer, such as root layer 250, which is by default the strongest or highest level layer.

In example layer data structure 200, layer 240 includes opinions 242 and 244 of the value of attributes 210 and 215. However, stacking order 235 places layer 205 as stronger than, or ahead of, layer 240. Thus, in the composite layer 230, the opinions of value 207 and 212 of layer 205 for attributes 210 and 215 will override corresponding opinions 242 and 244 in layer 240. However, as layer 205 does not define an opinion of value for attribute 247 of component 3, the opinion 245 in layer 240 will define the value of attribute 247 in the composite layer 230.

FIGS. 3A-3D illustrate a scene description data structure representing the state of a component and layer operations according to an embodiment of the invention. FIG. 3 illustrates a scene description data structure 300 representing the authored state of components in one or more scenes according to an embodiment of the invention. The authored state is the set of attribute values apart from any default or application-provided fallback attribute values for one or more components. The scene description data structure 300 specifies a graph or set of relationships between components as well as layer data structures specifying opinions of attribute values of components for one or more scenes. For a graph of relationships, components and layer data structures are referred to generally as nodes.

In an embodiment, the scene description data structure 300 combines two different aspects: a layer data structure, as described above, and cross-references to components. The layer data structure enables the progressive refinement and incremental modification of components as needed. The cross-references to components enables the encapsulation and reuse of components. Together, this combination enables: scene modification at any point of the digital production pipeline, in any order, without any loss of data in upstream or downstream activities of the digital production pipeline; unrestricted and progressive modification and refinement of components; and a unified system of scene specification and modification that enables any aspects of the scene to be added, removed, reused, or modified at any point of the digital production pipeline.

In an embodiment, scene description data structure 300 specifies the relationships between components and layer data structures, which express opinions of component attribute values, in a hierarchical graph structure. Nodes of scene description data structure 300 may correspond with components, such as data representing geometry, texturing, shading, articulation, animation, simulation, layout, lighting, or rendering, or with layer data structures.

In an embodiment, the hierarchical graph structure includes three different types of relationships between components and layers: namespace relationships, layer relationships, and cross-reference relationships. Namespace relationships establish the namespace or other nomenclature used to identify and organize components. Namespace relationships are used to assign components' identities, to match up components from different layers that should override each other, and to provide the scope of inclusion for references. Alternative embodiments can utilize other attributes, such as globally unique identifiers (GUIDs), to arrange components and layer data structures within the scene description data structure.

Layer relationships specify the relationship between a layer data structure and one or more sublayers. Layer relationships specify the layer stacking order used to composite or combine layers to determine attribute values of components.

Cross-reference relationships provide links to components specified elsewhere. A cross-reference relationship from a first component in a first layer data structure can reference a second component defined in the same layer data structure, a second component in another layer data structure associated with the first layer data structure, or a second component in another layer data structure that is not associated with the first layer data structure. Implementations of cross-reference relationships can be restricted to directly referencing only the root component in another layer data structure (with any child components referenced implicitly using namespace relationships associated with the root component) or alternatively can be unrestricted to allow direct referencing of any arbitrary component in another layer data structure.

In an embodiment, the scene description data structure 300 includes a root layer 305 for the scene. In an embodiment, the relationships of the hierarchical graph between components and layer data structures are specified, at least in part, by root layer 305. Child nodes, such as root component 310 and sublayers hierarchy 312 can be directly associated with the root layer 305.

In an embodiment of the hierarchical graph, each non-empty layer data structure, including the root layer 305, includes at least one root component, such as root component 310. Additional components within the layer data structure are associated as child nodes (or grandchild or other descendant nodes) of the root component. As an example of this embodiment, one or more additional components 315 are associated via namespace relationships 340 as descendant nodes of root component 310.

In an embodiment, the namespace relationships 340 between component nodes in a layer are specified in the form of relationship attributes of components. For example, component 315 can include a parent attribute, which would be set to reference component 310. In another embodiment, a component can include a child relationship attribute specifying one or more child components of the component. For example, root component 310 can include a child relationship attribute, which would be set to reference components 315.

In an embodiment of the hierarchical graph, each additional layer data structure of the scene description data structure is a descendant, or sublayer, of the root layer. As an example of this embodiment, the root layer 305 is associated with one or more additional layer data structures 312 via layer relationships 325. In an embodiment, the arrangement of layer data structures 312 relative to the root layer 305 and each other specifies the layer stacking order used to combine and override opinions of component attribute values to form the composite layer. Although omitted for clarity, in an embodiment of the scene description data structure, each additional layer data structure that is not empty includes its own root component, similar to root component 310. Furthermore, sublayers can include additional components associated with their respective root components via namespace relationships.

In a further embodiment, cross-reference relationships, such as cross-reference relationship 330, provides a link to one or more components specified elsewhere. A cross-reference relationship from a first component in a first layer data structure can reference a second, target component 320 defined in the same layer data structure, in another layer data structure associated with the first layer data structure, or in another layer data structure that is not associated with the first layer data structure. Implementations of cross-reference relationships 330 can be restricted to target only the root component in another layer data structure (with any child components referenced implicitly) or alternatively can be unrestricted to directly referencing any arbitrary target component in another layer data structure.

The scene description data structure 300 can combine both layering and cross-reference relationships to specify relationships and attributes in a scene. For example, a scene description data structure can use a cross-reference relationship to link to a pirate character model to be used in a scene. The pirate character model in turn is defined by a separate scene description data structure for the model that includes its own independent root layer and optional child layers. For example, a base or weak child layer of the model's scene description data structure may define the attributes of a general biped character model. One or more stronger layers modify the general biped character model by augmenting or overriding the attribute values defined in a weaker layer, for example by associating a pirate hat model with the character model or modifying the character model to replace its hand with a hook.

In an embodiment, the graph, or set of relationships between components and layers, defined by the scene description data structure 300 can be orthogonal, or completely independent, of any other optional graphs associated with the same components. Graphs can be used to define different sets of relationships for the same components in different scenes. For example, a second scene description data structure can be created to specify different relationships between components for additional scenes. Additional layers included in the second scene description data structure can further specify different attribute values for the components.

Additional independent graphs can also be specified to facilitate specific tasks within the digital production pipeline. For example, artists can create character models with an initial set of hierarchical relationships between different body parts, such as defining an arm model to be a child of a torso model. However, the scene description data structure 300 and associated layer data structures can define one or more alternative hierarchical relationships independent of the initial set of relationships specified by the artist. For example, the arm model could be defined as the parent of the torso model to facilitate convenient animation in one or more scenes.

In an embodiment, relationship attributes of components can also specify functional relationship between components. For example, relationships between coordinate transformation components include attributes specifying a specific sequence for applying transformations to models, weights specifying the influence of a reference frame on control points, joint spring forces, and/or joint rotation limits. In a further embodiment, relationship attributes can include additional data defining some parameter of a relationship. For example, a light source component can be related to a first model component, which indicates that the light source component provides light to the model component. The lighting relationship between these two components can further include a light intensity value to indicate the intensity of light from the light source on the first model. If a second lighting relationship is created between the light source component and a second model component, the second lighting relationship can include a different light intensity value.

As described above, different layers can be specified in different portions of the digital production pipeline, enabling components to be revised or refined without the need for explicit change isolation or versioning and without destroying the data previously specified for the component in weaker layers. This allows an independent variation of a component to be created and used without affecting the usage elsewhere of either the original component or any other variation of the same component. Moreover, because layers can express opinions of value for any attribute of a component, there are no restrictions on the type or extent of modifications permitted on cross-referenced components. Furthermore, scene description data structures can include cross-reference relationships to all or a portion of a component's layer data structure, enabling other scenes to encapsulate, reuse, and optionally modify the example character model component as defined by its layers at any point of the digital production pipeline.

Figure 3A:
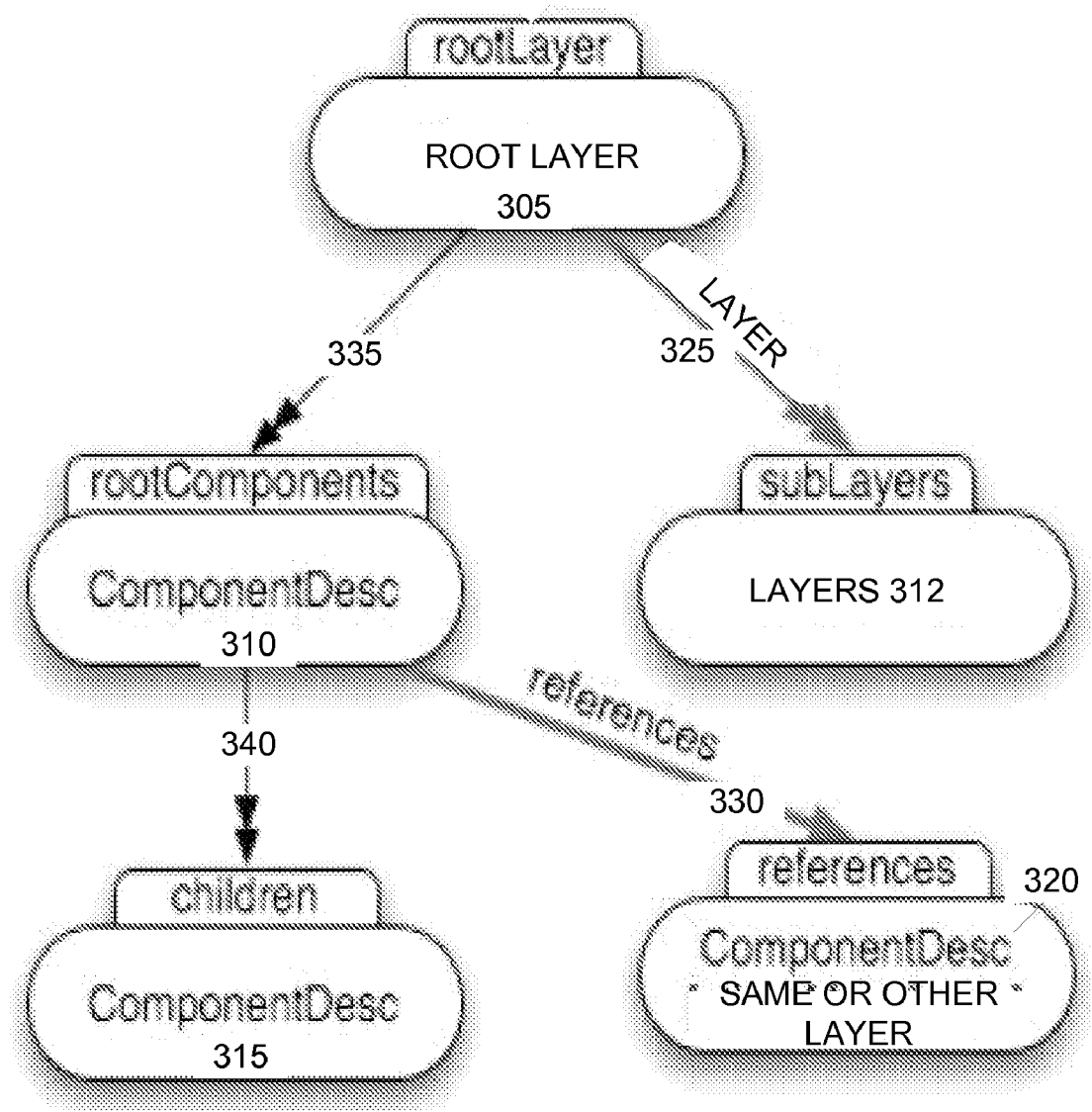
FIGS. 3A-3D illustrates a scene description data structure representing the state of a component according to an embodiment of the invention.
Figure 3B:
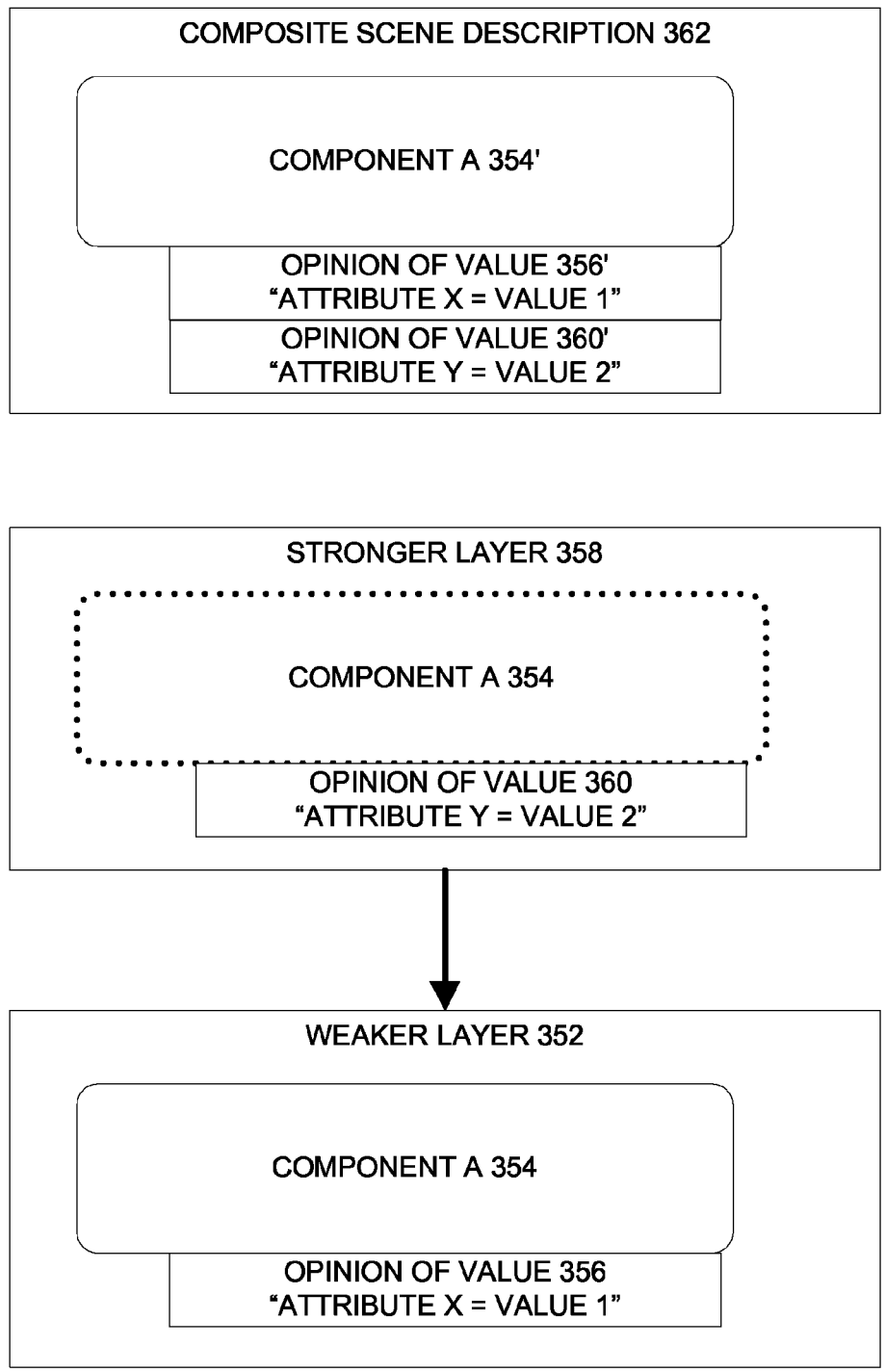

FIG. 3B illustrates a first example 350 of changing the semantic structure of components using layer data structures according to an embodiment of the invention. Example 350 includes a first layer data structure 352. Layer data structure 352 defines a first component, component A 354. Component A 354 includes a first opinion of value 356 specifying that "attribute X" has a value "Value 1." In an embodiment, both the existence "attribute X" as part of component A and its value are expressed by the first opinion of value 356. In this embodiment, there is no need for a component to have a previously declared "attribute X"; the first opinion of value 356 acts as a declaration of "attribute X" within the component and sets the value of this attribute to "Value 1."

Example 350 also includes layer data structure 358. Layer data structure 358 includes a second opinion of value 360 specifying that "attribute Y" has a value "Value 2." In an embodiment, there is no need for component A 354 to have a previously declared "attribute Y"; the second opinion of value 360 acts as a declaration of "attribute Y" within component A 354 and sets the value of this attribute to "Value 2."

A layering operation composites layer data structure 358 over layer data structure 352. The result is a composite scene description 362 including a composite version of component A 354' including "attribute X" 356' and "attribute Y" 360'.

Example 350 shows how layering can change the semantic structure of a component by adding attributes and corresponding behaviors. If a component is composited and instantiated from the first layer data structure 354 alone, it will include "attribute X" but not "attribute Y." Conversely, if a component is composited and instantiated from the second layer data structure 358 alone, the instantiated component will include "attribute Y" but not "attribute X." As a result, new attributes and behaviors can be added to a component without breaking or requiring the recompilation of previously completed work with prior versions of the component.

Figure 3C:
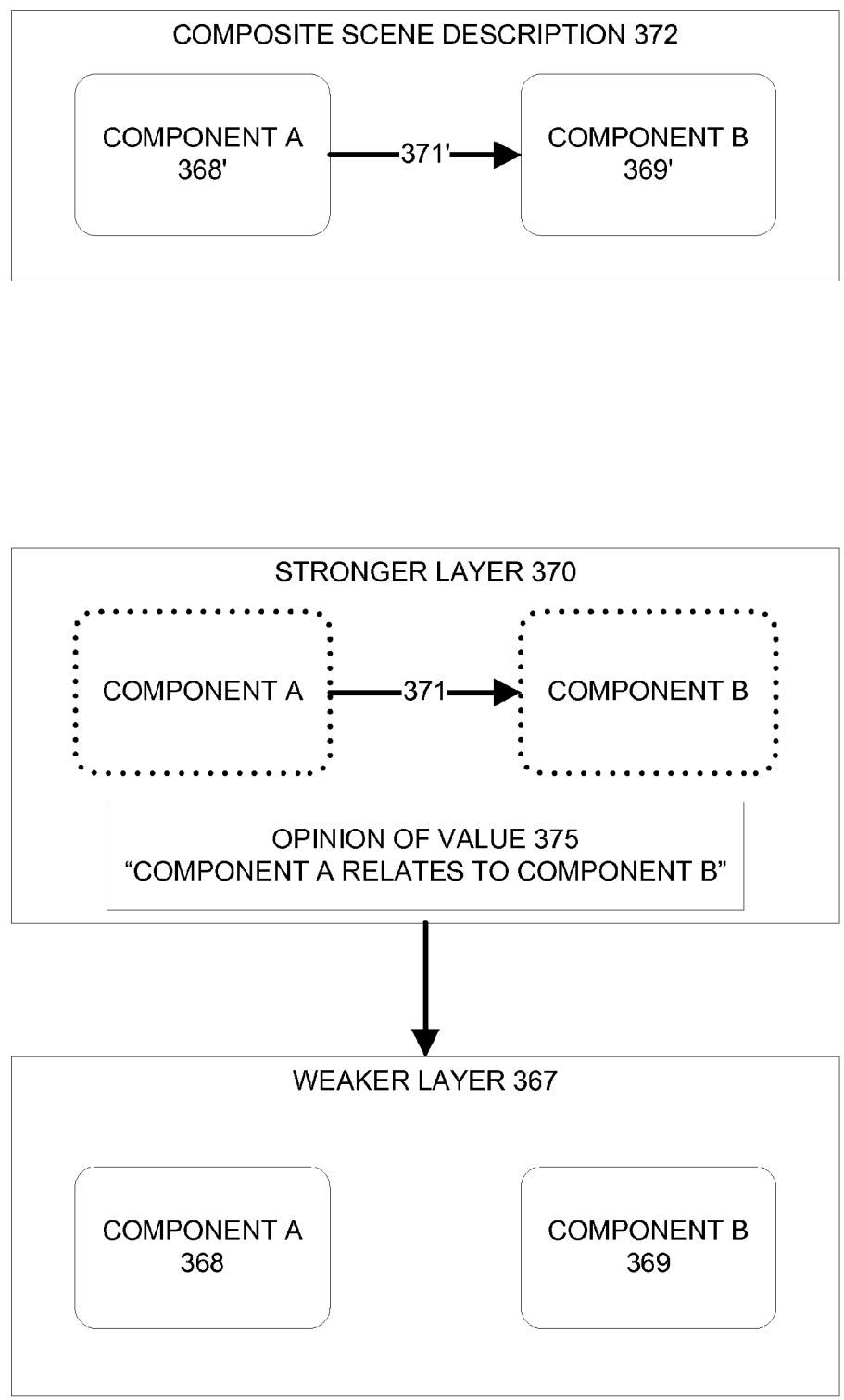

FIG. 3C illustrates a second example 365 of changing the semantic structure of components using layer data structures according to an embodiment of the invention. Example 365 includes a first layer data structure 367. Layer data structure 367 defines component A 368 and component B 369. A second layer data structure 370 defines a relationship 371 between component A 368 and component B 369. In an embodiment, relationship 371 is defined by an opinion of value 375 that declares a relationship attribute in component A 368 and/or component B 369 and assigns a value to the attribute to form the relationship 371. A layering operation composites layer data structure 370 over layer data structure 367. The result is a composite scene description 372 that includes composite versions of component A 368' and component B 369' associated by relationship 371'.

Example 365 shows how layering can change the semantic structure of components by adding a relationship between components. In an embodiment, neither component A 368 nor component B 369 as defined by layer data structure 367 need to declare an ability to form relationships with other components. In this embodiment, the opinion of value in layer data structure 370 both declares a relationship attribute for component A 368 and/or component B 369 and sets the value of the relationship attribute to form relationship 371. As a result, any type of component can be related to other components, even if the component was not originally defined with a relationship attribute.

Figure 3D:
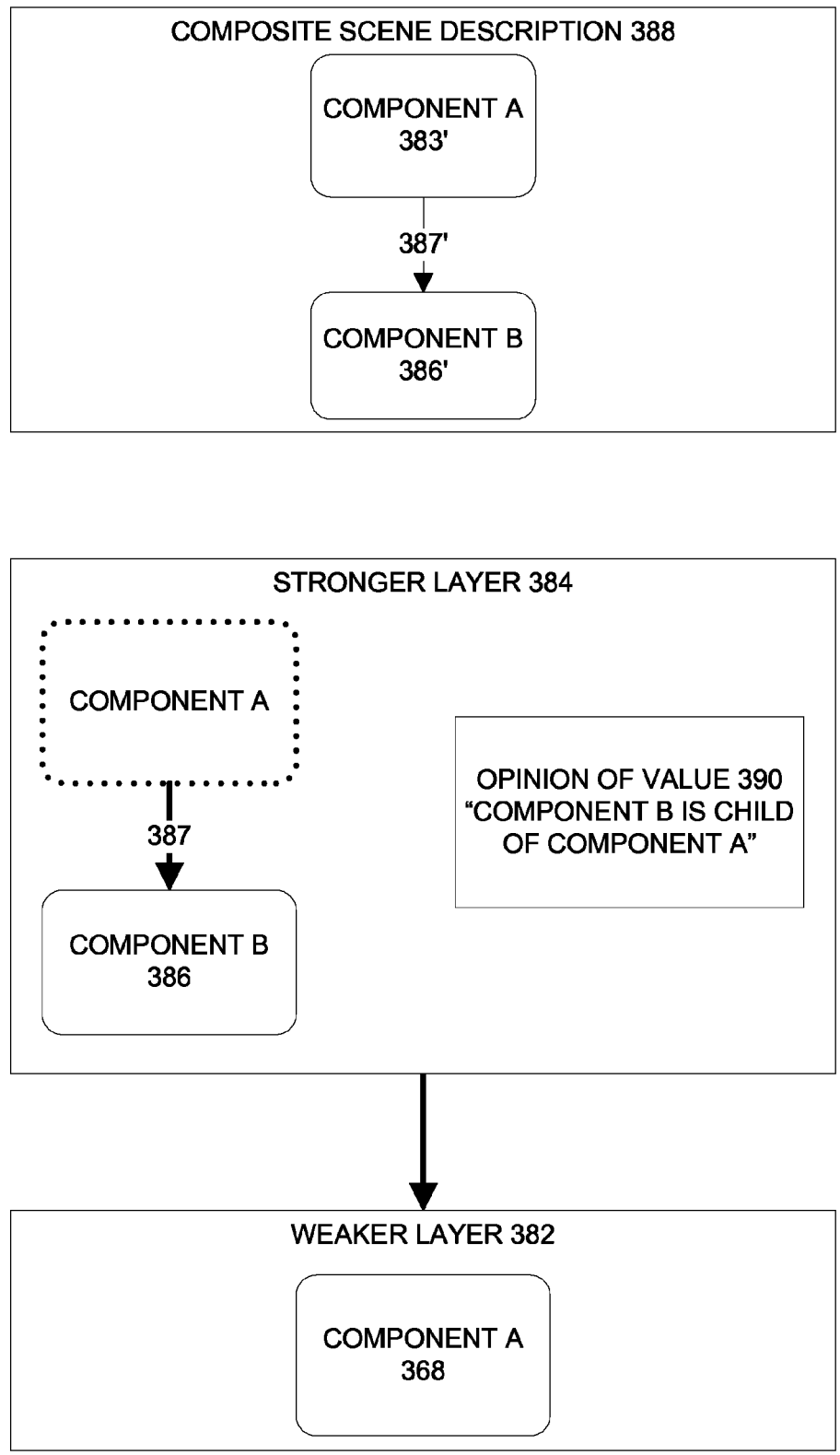

Similarly, FIG. 3D illustrates a third example 380 of changing the semantic structure of components using layer data structures according to an embodiment of the invention. Example 380 includes a first layer data structure 382. Layer data structure 382 defines component A 383. A second layer data structure 370 defines a second component B 386 and relationship 387 between component A 383 and component B 386. In an embodiment, relationship 387 is defined by an opinion of value 390 that declares a relationship attribute in component B 386 and assigns a value to the relationship attribute to form the relationship 387. In this example 380, relationship 387 defines component B 386 as a namespace child of component 383.

A layering operation composites layer data structure 384 over layer data structure 382. The result is a composite scene description 388 that includes composite versions of component A 383' and component B 386' associated by relationship 387'. In composite scene description 388, component B 386' is the namespace child of component A 383'.

Example 385 shows how layering can change the semantic structure of components by adding a new component to the namespace associated with a previously defined component. Component 383 as defined in layer data structure 382 does not need to declare any relationship with other components or even the ability for component 383 to act as a parent or child of any other components. In an embodiment, an opinion of value in layer data structure 384 both declares the existence of an attribute defining a namespace relationship and sets its value form relationship 387.

Figure 4:
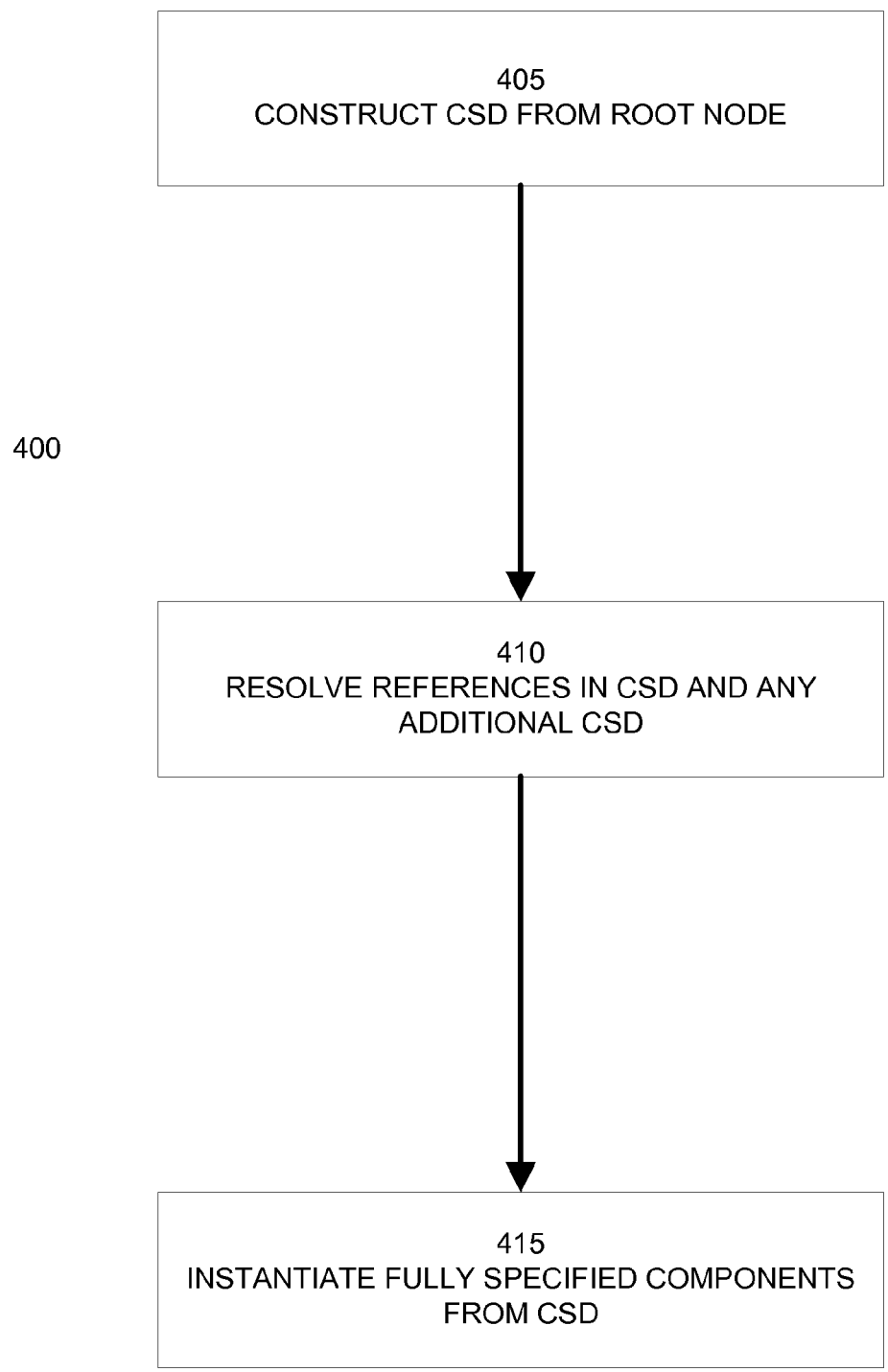
FIG. 4 illustrates a method of processing a scene description data structure according to an embodiment of the invention.

FIG. 4 illustrates a method 400 of processing a scene description data structure according to an embodiment of the invention. Method 400 constructs a composite scene description (CSD) for a scene description data structure. A composite scene description is a data structure specifying all of the authored components associated with a scene, the authorized relationships between all of the components in the scene, and all of the authored component attribute values associated with the scene. In an embodiment, the composite scene description includes sufficient information to instantiate all of the components of the scene on the stage data structure 120 in system 100.

Step 405 selects the root layer of the scene description data structure and constructs a corresponding composite scene description. As discussed in detail below, a composite scene description is constructed by starting at the root layer and traversing the component and layer hierarchies defined in the scene description data structure. The namespace hierarchy between components defines relationships between components and a layer stacking order defines the order for combining layers into a single composite layer. The layers and components associated with the scene description data structure are composited according to this layer stacking order to determine a composite scene description or composite layer specifying at least a portion of the component attribute values for a scene.

Step 410 resolves cross-references in the composite scene description. As discussed above, the scene description data structure can include cross-reference relationships between components. In an embodiment, step 410 resolves these cross-reference relationships, if any, in the composite scene description to fill in any "gaps" in the scene. The details of step 410 are discussed below.

Following step 410, the composite scene description fully specifies all of the components associated with a scene, the relationships between all of the components in the scene, and all of the authored component attribute values associated with the scene. Step 415 then instantiates the components of the scene, for example within a stage data structure, using the composite scene description. Further embodiments of the invention may cache all or portions of the composite scene description to expedite the processing, instantiation, and assembly of components in the scene data structure for editing, rendering, or inspecting components and digital assets at any part of the digital production pipeline. For example, the composite scene description can be stored as a new digital asset for later use.

Figure 8:
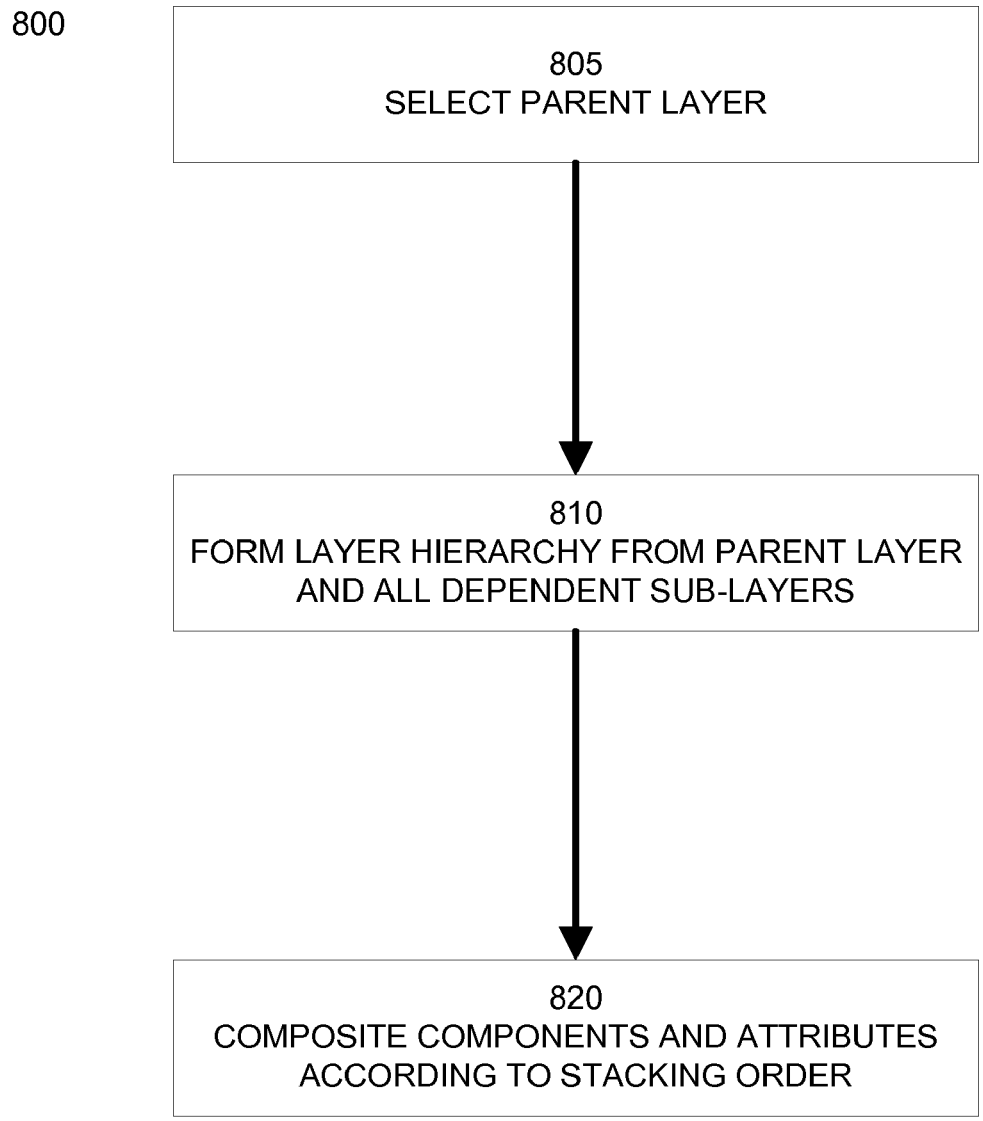
FIG. 8 illustrates a method of constructing a new composite scene description from a scene description data structure.

FIG. 8 illustrates a first phase 800 of a method of processing a scene description data structure according to an embodiment of the invention. Phase 800 constructs a new composite scene description from a scene description data structure.

Phase 800 is initialized with a reference to a selected layer of scene description data structure. An embodiment of phase 800 creates a new composite scene description with components, component attributes, and component relationships provided by the selected layer and its descendent layers. In one application, step 405 selects the root layer of the scene description data structure and invokes phase 800 to produce a composite scene description. In other applications, discussed below, a different layer may be selected to produce an additional composite scene description.

Step 805 of phase 800 selects a root layer data structure. In an embodiment, the root layer data structure corresponds with the selected layer of the scene description data structure provided to phase 800.

Step 810 determines a layer hierarchy from the scene description data structure. In an embodiment, step 810 recursively processes the scene description data structure to build a hierarchy of layers descended from the selected root layer. The layer hierarchy defines the layer stacking order used to composite layers. In an embodiment, step 810 recursively traverses the layer hierarchy defined by the scene description data structure to determine the layer stacking order for layer data structures. In an embodiment, step 810 traverses all of the descendent layers of the selected root layer until all of the leaf, or bottom, layers are reached.

As discussed above, multiple independent graphs can be specified to facilitate specific tasks within the digital production pipeline. For example, artists can create character models with an initial set of hierarchical relationships between different body parts, such as defining an arm model to be a child of a torso model. However, the scene description data structure 300 and associated layer data structures can define one or more alternative hierarchical relationships independent of the initial set of relationships specified by the artist. For example, the arm model could be defined as the parent of the torso model to facilitate convenient animation in one or more scenes.

Figure 7:
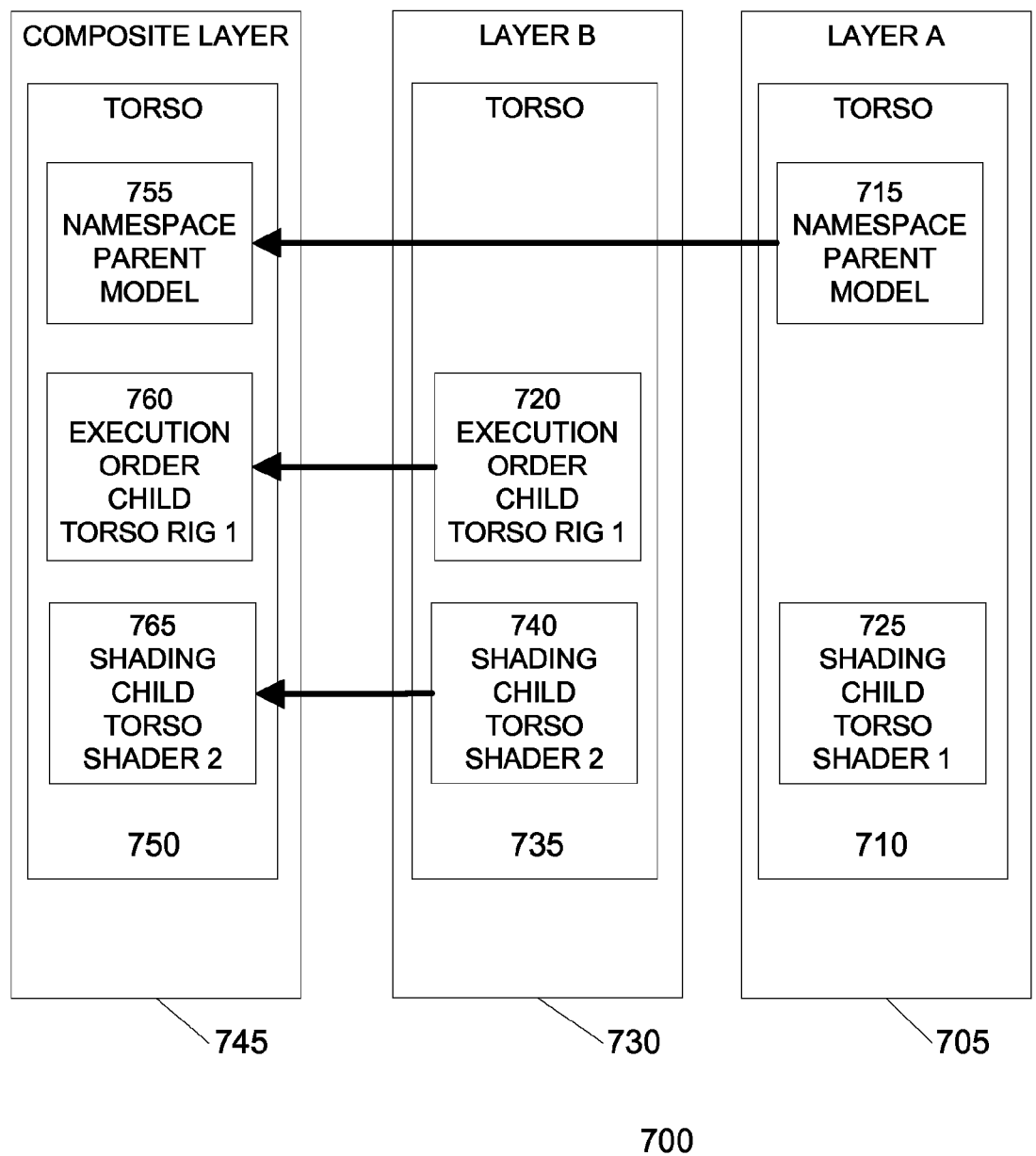
FIG. 7 illustrates an example application of layer data structures to specify and modify graph relationship attributes defining a graphs of components according to an embodiment of the invention.

FIG. 7 illustrates an example application of layer data structures to specify and modify graph relationship attributes defining a graphs of components according to an embodiment of the invention. A set of layer data structures 700 includes a first layer 705. Layer 705 includes a component 710, in this example a torso model. In this example, layer 705 specifies two graph relationship attributes for component 710: a namespace parent attribute 715 set to a model element and a shading child attribute 725 set to a torso shading program 1.

Layer 730 includes component 735, corresponding with component 710 in layer 705. In this example, layer 730 specifies two graph relationship attributes for component 735: a rigging child attribute 720 set to a torso rig 1 component and a shading child attribute 740 set to a torso shading program 2.

Layers 705 and 730 are composited according to a layer stacking order to produce a composite layer specifying the authored state of one or more components. In this example, layer 735 is composited over layer 705. As a result, a composite layer 745 includes a component 750, corresponding with components 735 and 710 in layers 730 and 705, respectively. In example composite layer 745, the component 750 is defined to have three graph relationship attributes: namespace parent attribute 755, which was contributed by layer 705; rigging child attribute 760, which was contributed by layer 730; and shading child attribute 765, which was initially contributed by layer 705 and overridden in value by layer 730.

From this example, it can be seen that layer data structures can be used to create arbitrary independent graphs of components. Furthermore, as layer data structures can be defined or modified at any point of the digital production pipeline, graphs of components can be defined or modified at any point of the digital production pipeline as well.

In an embodiment, graph relationship attributes of components can also specify functional relationship between components. For example, relationships between coordinate transformation components can specify a specific sequence for applying transformations to models. In a further embodiment, graph relationship attributes can include additional data defining some parameter of a relationship. For example, a light source component can be related to a first model component, which indicates that the light source component provides light to the model component. The lighting relationship between these two components can further include a light intensity value to indicate the absolute or relative intensity of light from the light source on the first model. If a second lighting relationship is created between the light source component and a second model component, the second lighting relationship can include a different light intensity value.

As described above, different layers of the parent layer data structure node can be specified in different portions of the digital production pipeline, enabling the example child node character model component to be revised or refined without the need for explicit change isolation or versioning and without destroying the data previously specified for the example child node character model. Furthermore, additional scene description data structures can include cross-reference relationships to all or a portion of the parent node layer data structure, enabling other scenes to encapsulate, reuse, and optionally modify the example character model component as defined at any point of the digital production pipeline.

Figure 9:
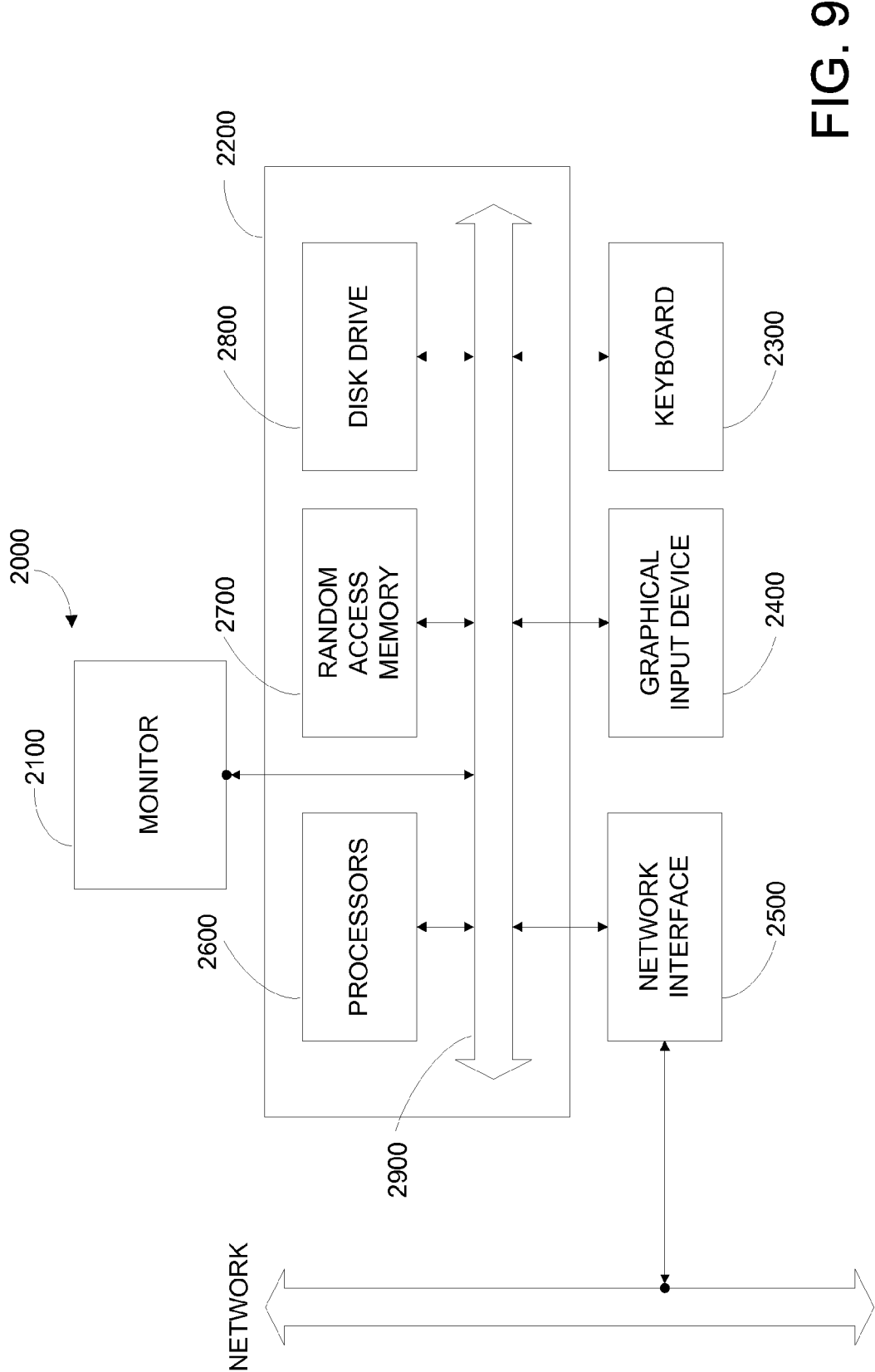
FIG. 9 illustrates a computer system suitable for implementing an embodiment of the invention.

FIG. 9 illustrates a computer system 2000 suitable for implementing an embodiment of the invention. Computer system 2000 typically includes a monitor 2100, computer 2200, a keyboard 2300, a user input device 2400, and a network interface 2500. User input device 2400 includes a computer mouse, a trackball, a track pad, graphics tablet, touch screen, and/or other wired or wireless input devices that allow a user to create or select graphics, objects, icons, and/or text appearing on the monitor 2100. Embodiments of network interface 2500 typically provides wired or wireless communication with an electronic communications network, such as a local area network, a wide area network, for example the Internet, and/or virtual networks, for example a virtual private network (VPN).

Computer 2200 typically includes components such as one or more processors 2600, and memory storage devices, such as a random access memory (RAM) 2700, disk drives 2800, and system bus 2900 interconnecting the above components. Processors 2600 can include one or more general purpose processors and optional special purpose processors for processing video data, audio data, or other types of data. RAM 2700 and disk drive 2800 are examples of tangible media for storage of data, audio/video files, computer programs, applet interpreters or compilers, virtual machines, and embodiments of the herein described invention. Other types of tangible media include floppy disks; removable hard disks; optical storage media such as DVD-ROM, CD-ROM, and bar codes; non-volatile memory devices such as flash memories; read-only-memories (ROMS); battery-backed volatile memories; and networked storage devices.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A data structure embedded in a tangible computer-readable storage medium for representing a component, the data structure comprising: a first attribute specifying a first relationship in a first graph between the component and at least a second component; and a second attribute specifying a second relationship in a second graph between the component and at least the second component; wherein the first and second relationships are adapted to specify component qualities associated with first and second graphs, such that the component inherits a first component quality of a first type via the first graph and a second component quality of a second type via the second graph, and further comprising: a first set of layer data structures including at least one layer, wherein the first set of layer data structures defines a first authored state of the component including the first attribute and the second attribute to the component; and a second set of layer data structures including at least one layer, wherein the second set of layer data structures includes opinions of value of the first attribute and the second attribute of the component, thereby overriding the first authored state of the component to define a second authored state of the component including the opinions of value of the first attribute and the second attribute of the component during a layer composition operation performed by a processor.

2. The data structure of claim 1, wherein the first relationship includes a specification of set membership of the component in a first set.

3. The data structure of claim 2, wherein the second relationship includes a specification of set membership of the component in a second set different from the first set.

4. The data structure of claim 1, wherein the first relationship includes a specification of inclusion of a first effect from the second component.

5. The data structure of claim 4, wherein the second relationship includes a specification of inclusion of a second effect from the second component.

6. The data structure of claim 1, wherein the first relationship includes a specification of a first ordering of the component relative to the second component.

7. The data structure of claim 6, wherein the first relationship includes a specification of a second ordering of the component relative to the second component.

8. The data structure of claim 1, wherein the first graph does not depend on the second graph.

9. The data structure of claim 1, wherein the first graph has a first graph topology and the second graph has a second graph topology different from the first graph topology.

10. The data structure of claim 9, wherein the first graph is adapted to represent a first type of component relationship and the second graph is adapted to represent a second type of component relationship.

11. The data structure of claim 10, wherein the first and second types of component relationships are selected from a group consisting of:
namespace graph relationships adapted to identify components; shading relationships; execution relationships; transformation relationships; simulation relationships; modeling relationships; lighting relationships; and custom-defined relationships.

12. The data structure of claim 1, wherein the first graph includes a first graph policy implementing a first restriction on the first relationship and the second graph includes a second graph policy implementing a second restriction on the second relationship.

13. The data structure of claim 12, wherein the first graph policy is enforced by a first software tool of a digital production pipeline, wherein the first software tool is adapted to access components included in the first graph.

14. The data structure of claim 12, wherein the second graph policy is enforced by a second software tool of a digital production pipeline, wherein the second software tool is adapted to access components included in the second graph.

15. The data structure of claim 1, wherein the first attribute includes a parameter specifying a component quality of the first relationship between the component and the second component.

16. The data structure of claim 1, wherein the first and second attributes are included in the component.

17. The data structure of claim 1, wherein the first and second attributes are included in a portion of the data structure outside of the component.

18. The data structure of claim 1, further comprising:
a first set of layer data structures including at least one layer, wherein the first set of layer data structures is adapted to add the first attribute and the second attribute to the component.

19. The data structure of claim 18, further comprising:
a second set of layer data structures including at least one layer, wherein the second set of layer data structures defines a first authored state of the component, wherein the first authored state of the component does not include the first and second attributes.

20. The data structure of claim 1, wherein the first relationship is a functional relationship between the component and the second component.

21. The data structure of claim 20, wherein the functional relationship is adapted to be implemented by a first software tool of a digital production pipeline, wherein the first software tool is adapted to access the first graph.

22. The data structure of claim 21, wherein the functional relationship specifies an execution order of the component relative to the second component.

23. The data structure of claim 21, wherein the functional relationship specifies a transformation relationship of the component relative to the second component.

24. The data structure of claim 21, wherein the functional relationship specifies a lighting relationship of the component relative to the second component.

25. A data structure embedded in a tangible computer-readable storage medium for representing a component, the data structure comprising: a first attribute specifying a first relationship in a first graph between the component and at least a second component; and a second attribute specifying a second relationship in a second graph between the component and at least the second component; wherein the first and second relationships are adapted to specify component qualities associated with first and second graphs, such that the component includes a first component quality associated with the first graph and specifying a first ordering of the component relative to the second component in the first graph and the component includes a second component quality associated with the second graph, and further comprising: a first set of layer data structures including at least one layer, wherein the first set of layer data structures defines a first authored state of the component including the first attribute and the second attribute to the component; and a second set of layer data structures including at least one layer, wherein the second set of layer data structures includes opinions of value of the first attribute and the second attribute of the component, thereby overriding the first authored state of the component to define a second authored state of the component including the opinions of value of the first attribute and the second attribute of the component during a layer composition operation performed by a processor.

26. The data structure of claim 25, wherein the second component quality includes a specification of a second ordering of the component relative to the second component in the second graph different than the first ordering.

27. The data structure of claim 25, wherein the second component quality includes a specification of an inheritance of a first component quality via the second graph.

28. The data structure of claim 27, wherein the first component quality includes a specification of an inheritance of a third component quality via the first graph.

29. The data structure of claim 25, wherein the second relationship includes a specification of set membership of the component in a first set.

30. The data structure of claim 29, wherein the first relationship includes a specification of set membership of the component in a second set different from the first set.

31. The data structure of claim 25, wherein the second relationship includes a specification of inclusion of a first effect from the second component.

32. The data structure of claim 31, wherein the first relationship includes a specification of inclusion of a second effect from the second component.

33. The data structure of claim 25, wherein the first graph does not depend on the second graph.

34. The data structure of claim 25, wherein the first graph has a first graph topology and the second graph has a second graph topology different from the first graph topology.

35. The data structure of claim 25, wherein the first graph is adapted to represent a first type of component relationship and the second graph is adapted to represent a second type of component relationship.

36. The data structure of claim 35, wherein the first and second types of component relationships are selected from a group consisting of:
namespace graph relationships adapted to identify components; shading relationships; execution relationships; transformation relationships; simulation relationships; modeling relationships; lighting relationships; and custom-defined relationships.

37. The data structure of claim 25 wherein the first graph includes a first graph policy implementing a first restriction on the first relationship and the second graph includes a second graph policy implementing a second restriction on the second relationship.

38. The data structure of claim 25, wherein the ordering includes an execution order of components including the first component.

39. The data structure of claim 38, wherein the ordering includes an execution order of articulation components including the first component.

40. The data structure of claim 37, wherein the first graph policy is enforced by a first software tool of a digital production pipeline, wherein the first software tool is adapted to access components included in the first graph.

41. The data structure of claim 40, wherein the second graph policy is enforced by a second software tool of a digital production pipeline, wherein the second software tool is adapted to access components included in the second graph.

42. The data structure of claim 25, wherein the first attribute includes a parameter specifying a component quality of the first relationship between the component and the second component.

43. The data structure of claim 25, wherein the first and second attributes are included in the component.

44. The data structure of claim 25, wherein the first and second attributes are included in a portion of the data structure outside of the component.

45. The data structure of claim 25, further comprising:
a first set of layer data structures including at least one layer, wherein the first set of layer data structures is adapted to add the first attribute and the second attribute to the component.

46. The data structure of claim 45, further comprising:
a second set of layer data structures including at least one layer, wherein the second set of layer data structures defines a first authored state of the component, wherein the first authored state of the component does not include the first and second attributes.

47. The data structure of claim 25, wherein the first relationship is a functional relationship between the component and the second component.

48. The data structure of claim 47, wherein the functional relationship is adapted to be implemented by a first software tool of a digital production pipeline, wherein the first software tool is adapted to access the first graph.

49. The data structure of claim 47, wherein the functional relationship specifies an execution order of the component relative to the second component.

50. The data structure of claim 47, wherein the functional relationship specifies a transformation relationship of the component relative to the second component.

51. The data structure of claim 47, wherein the functional relationship specifies a lighting relationship of the component relative to the second component.

52. A system including a processor and a memory for managing components in a digital production pipeline, the system comprising: a first module adapted to determine an authored state of components, wherein each component includes a first graph relationship attribute specifying a relationship in a first graph and a second graph relationship attribute specifying a relationship in a second graph; and a second module adapted to determine a first graph of components and a second graph of components, wherein the first graph is independent of the second graph, wherein the first module includes logic adapted to determine the authored state of components from a set of layer data structures including at least one layer specifying attributes and attribute values of the components, and wherein the set of layer data structures includes a first subset of layer data structures including at least one layer, wherein the first subset of layer data structures defines a first authored state of the component including the first attribute and the second attribute to the component; and a second subset of layer data structures including at least one layer, wherein the second subset of layer data structures includes opinions of value of the first attribute and the second attribute of the component, thereby overriding the first authored state of the component to define a second authored state of the component including the opinions of value of the first attribute and the second attribute of the component during a layer composition operation performed by the processor.

53. The system of claim 52, further comprising:
an application programming interface adapted to be accessed by software tools of the digital production pipeline, wherein the application programming interface is adapted to enable software tools to access the first and second graphs.

54. The system of claim 53, wherein the application programming interface is further adapted to receive a modification of at least one graph relationship attribute of at least one component and to modify at least one of the first and second graphs in response to the modification.

55. The system of claim 53, wherein the application programming interface is further adapted to provide a parameter specifying a property of a relationship within the first graph between at least two components to the software tools.

56. The system of claim 52, wherein the first module is adapted to add to each component a first component quality of a first type specified by the first graph and a second component quality of a second type specified by the second graph.

57. The system of claim 52, wherein the set of layer data structures includes a first subset of layer data structures, wherein the first subset of layer data structures is adapted to add the first graph relationship attribute and the second graph relationship attribute to the component.

58. The system of claim 57, wherein the set of layer data structures includes a second subset of layer data structures, wherein the second subset of layer data structures defines a first authored state of the component, wherein the first authored state of the component does not include the first and second graph relationship attributes.

59. The system of claim 52, further comprising:
a third module adapted to optimize components in the first graph according to a first optimization technique and to optimize components in the second graph according to a second optimization technique.

60. The system of claim 52, wherein the first graph includes component relationships having relationship types selected from a group consisting of:
namespace graph relationships adapted to identify components; shading relationships; execution relationships; transformation relationships; simulation relationships; modeling relationships; lighting relationships; and custom-defined relationships.

* * * * *